United States Patent [19]
Suzuki

[11] Patent Number: 5,297,126
[45] Date of Patent: Mar. 22, 1994

[54] COMPACT DISK PLAYER WITH A MECHANISM FOR EJECTING A SELECTED DISK

[75] Inventor: Shoji Suzuki, Iwaki, Japan

[73] Assignee: Alpine Electronics, Inc., Tokyo, Japan

[21] Appl. No.: 747,556

[22] Filed: Aug. 20, 1991

[30] Foreign Application Priority Data

Sep. 12, 1990 [JP] Japan .................................. 2-241494
Sep. 12, 1990 [JP] Japan .................................. 2-241495
Sep. 13, 1990 [JP] Japan .................................. 2-245692

[51] Int. Cl.⁵ ...................... G11B 33/02; G11B 17/00
[52] U.S. Cl. ..................................... 369/77.1; 369/36; 369/75.2; 369/178; 369/34
[58] Field of Search ................. 369/77.1, 36, 34, 75.2, 369/178, 77.2; 360/99.06, 98.06, 92

[56] References Cited

U.S. PATENT DOCUMENTS

| | | | |
|---|---|---|---|
| 4,701,899 | 10/1987 | d'Arc | 369/38 |
| 4,701,900 | 10/1987 | Hasegawa et al. | 369/36 |
| 5,025,338 | 6/1991 | Sone et al. | 360/99.06 |
| 5,046,059 | 9/1991 | Yoshida et al. | 369/36 |
| 5,058,094 | 10/1991 | Suzuki | 369/77.1 |
| 5,093,818 | 3/1992 | Suzuki | 369/36 |
| 5,103,437 | 4/1992 | Kawakami | 369/36 |
| 5,119,354 | 6/1992 | Umesaki | 369/36 |
| 5,130,959 | 7/1992 | Wakatsuki et al. | 369/77.2 |
| 5,136,563 | 8/1992 | Takemasa et al. | 369/36 |
| 5,138,591 | 8/1992 | Ogawa et al. | 369/36 |
| 5,159,585 | 10/1992 | Ikedo et al. | 369/36 |
| 5,161,138 | 11/1992 | Caspers | 369/36 |
| 5,166,918 | 11/1992 | Kamijo | 369/77.1 |
| 5,253,218 | 10/1993 | Suzuki | 369/75.1 |

FOREIGN PATENT DOCUMENTS

| | | |
|---|---|---|
| 0392489 | 11/1990 | European Pat. Off. . |
| 2126004 | 8/1983 | United Kingdom . |
| 2229850 | 2/1990 | United Kingdom . |
| 2241603 | 10/1990 | United Kingdom . |
| 2241817 | 10/1990 | United Kingdom . |
| 2242055 | 10/1990 | United Kingdom . |
| 2241602 | 11/1990 | United Kingdom . |

Primary Examiner—Paul M. Dzierzynski
Assistant Examiner—Kim-Kwok Chu
Attorney, Agent, or Firm—Guy W. Shoup; Norman R. Klivans; B. Noel Kivlin

[57] ABSTRACT

A disk player with a disk select function comprises a playback unit consisted of a rotation mechanism for rotating a disk, a clamper for placing the disk on the rotation mechanism, and a pickup positioned to face the disk; a magazine having an opening positioned to direct toward the playback unit and accommodating a plurality of disks therein; and a disk feeding mechanism positioned in front of the opening of the magazine to feed a desired disk in the magazine toward the playback unit. In this disk player, an ejection mechanism for protruding the desired disk through the opening is provided in the magazine, a driven part for operating the ejection mechanism is provided on the front lateral side of the magazine in the direction of insertion thereof, and a drive mechanism engaging the driven part to drive the ejection mechanism is provided on a body of the disk player. The disk player has a minimum installation space for the mechanism to eject the disk from the magazine and facilitates replacement of the disks in the magazine, while simplifying the internal structure, reducing the size of the magazine and ejecting the disk reliably.

15 Claims, 11 Drawing Sheets

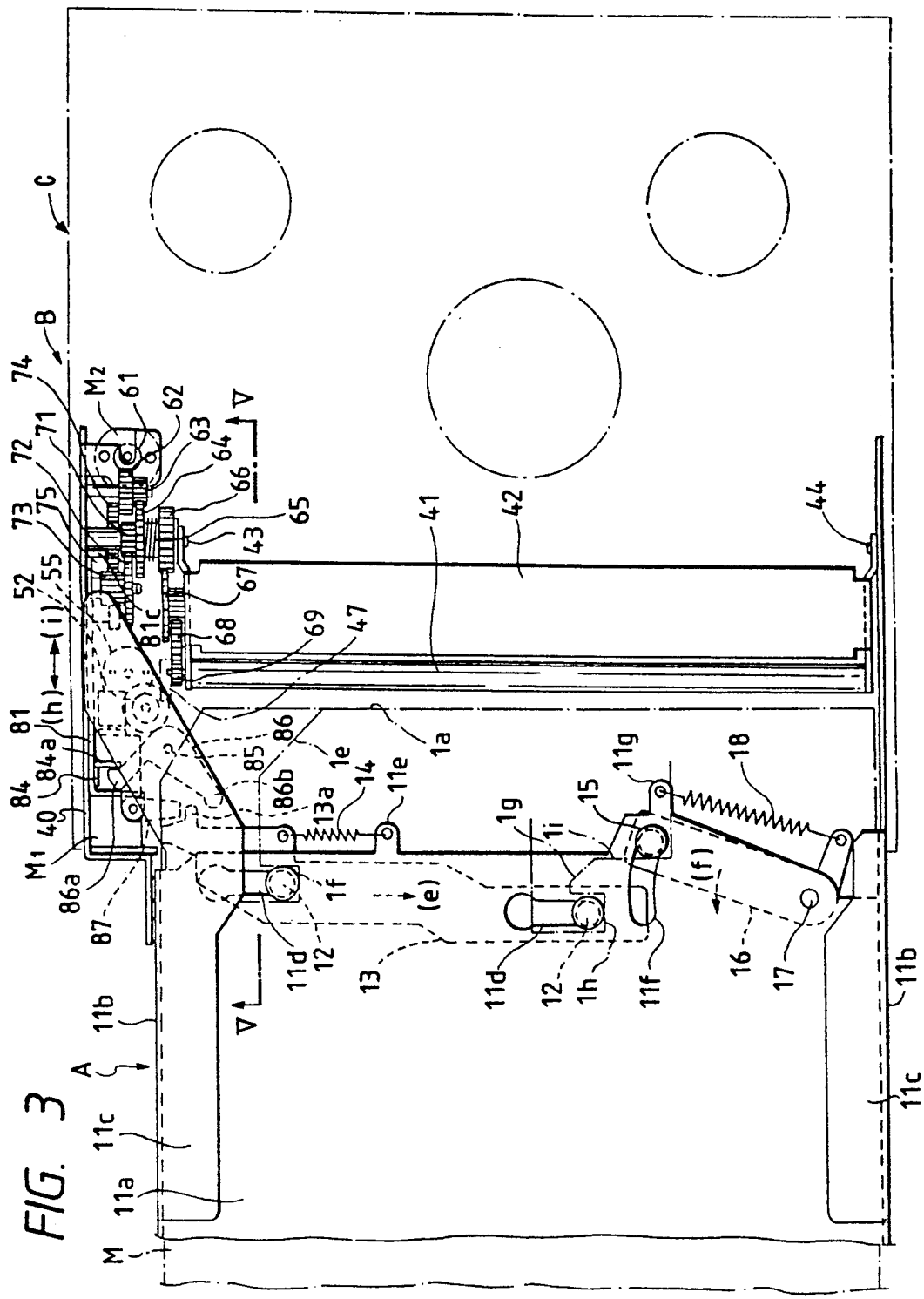

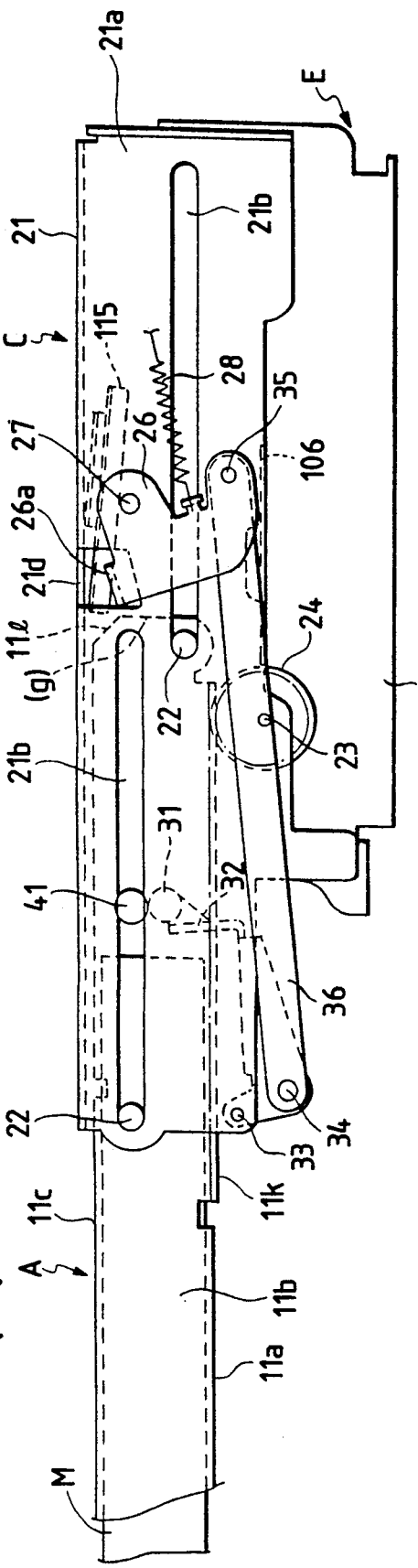
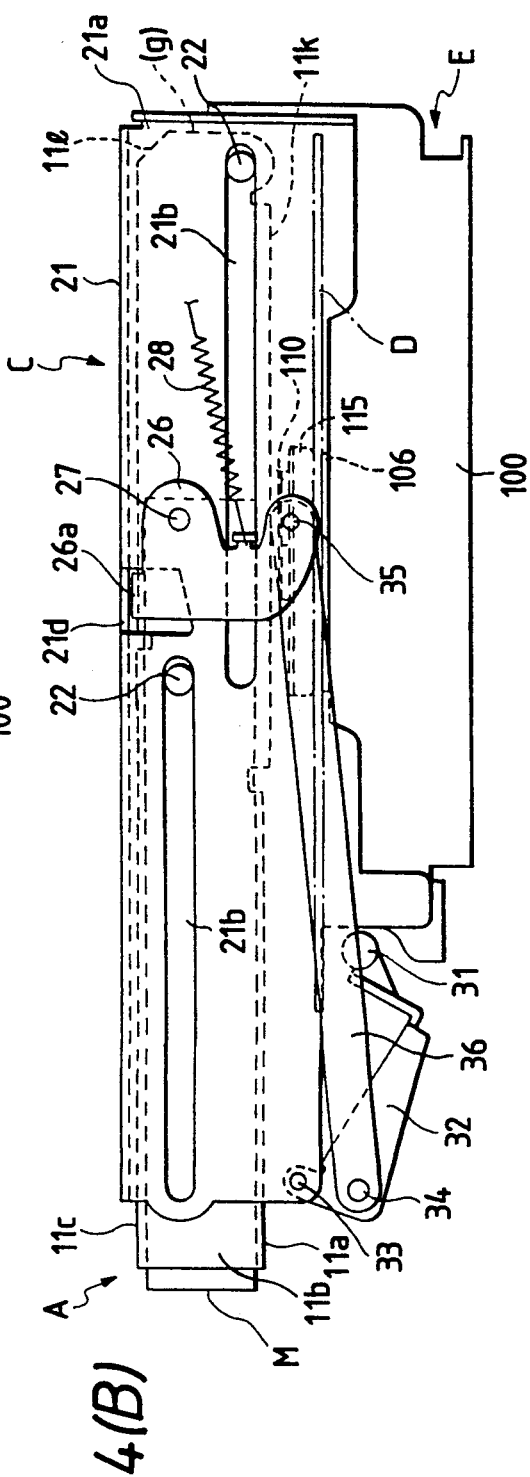

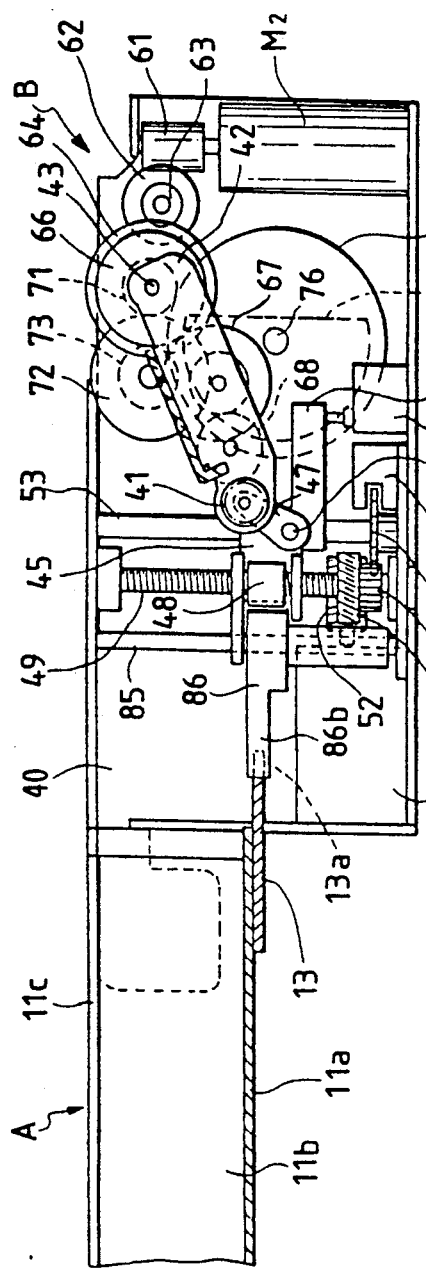
FIG. 5
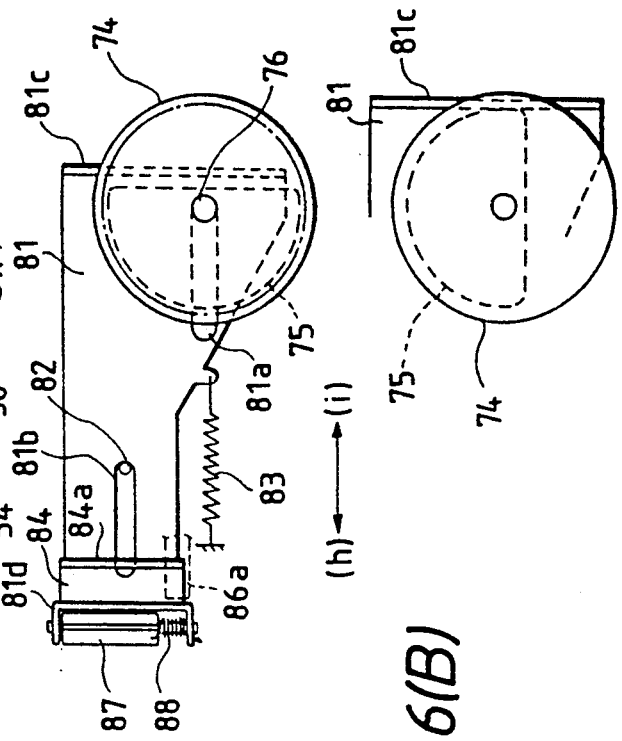
FIG. 6(A)
FIG. 6(B)

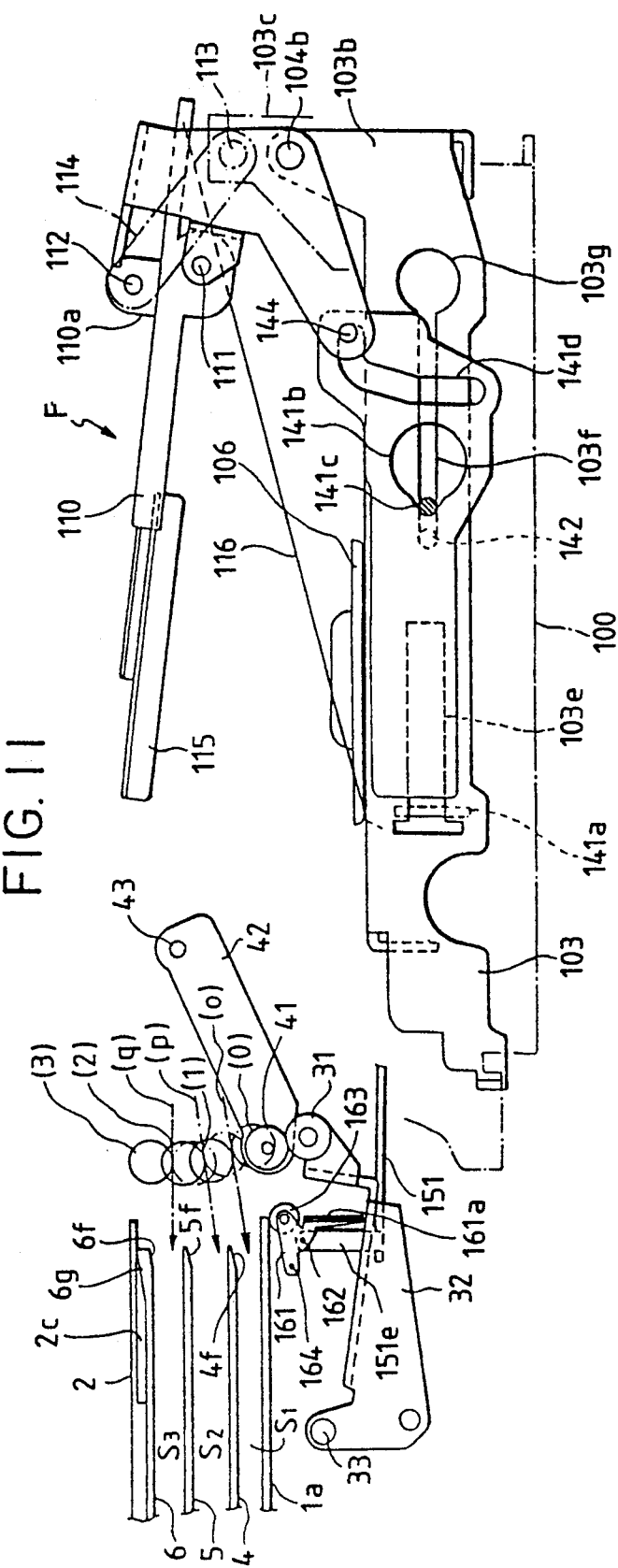
FIG. 11
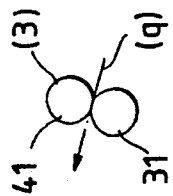
FIG.12C
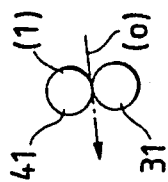
FIG.12A
FIG.12B

COMPACT DISK PLAYER WITH A MECHANISM FOR EJECTING A SELECTED DISK

BACKGROUND OF THE INVENTION

1. Field of the Invention

The present invention relates to a disk player with a disk select function in which one desired disk is drawn out of a magazine accommodating a plurality of disks and placed on a playback unit to play back music or the like.

2. Related Prior Art

The so-called disk changer is known as a recent version of automotive or home audio equipment. The disk changer is arranged such that a plurality of compact disks are stored in a magazine and, after loading the magazine into the changer, the disk or the music number to be played back is instructed or programmed. In the disk changer, a desired disk in the magazine is selected in accordance with the instruction or program inputted, and is clamped in place by a rotation mechanism (turntable) and a clamper, both provided in a playback unit, for playing back the music.

The magazine to be loaded into this type disk changer is required to have a disk storage space capable of accommodating a plurality of disks, and have a function capable of ejecting or pushing out a desired one of the disks accommodated in the space through an opening. In conventional magazines for use with general disk changers, the magazine interior is divided by partition plates to form spaces for accommodating plural disks. Further, an ejector member for ejecting the disk is provided on the rear side of the magazine opposite to the direction of insertion of the disk.

Because the above conventional magazine is provided in its rear portion with the ejector member for pushing out the disk in the magazine, the disk changer is required to have a drive mechanism located behind the magazine in opposite relation to the ejector member thereof. The implementation of the drive mechanism necessitates a drive lever provided to extend from the side of the space, into which the magazine is loaded, to a position rearwardly of the magazine. Thus, the disk changer must have a large space enough to install the drive mechanism therein, which prevents a reduction in size of the disk changer.

In addition, the internal structure of the conventional magazine is complicated because of the partition plates and the ejector members both provided in the magazine. Particularly, the provision of fixed partition plates requires smaller tolerances in design values necessary for control of spacings between the partition plates and hence increases production cost. The ejector member provided in the rear portion of the magazine is restricted in its range of movement from the positional relation to the partition member and other components, making it very difficult to push out the disk from the opening through a dimension sufficient for allowing the disk to be drawn out.

Further, when ejecting the disk already accommodated in the conventional magazine for the purpose of replacing the disk with a new one when the magazine is not loaded into the disk changer, the disk is taken out with pushing the corresponding ejector member by a finger or the like. At this time, since the plural ejector members are arranged side by side in close relation, it is very difficult to operate the ejector members individually. Thus, in the conventional magazine the disks cannot be easily taken out from the magazine separately.

SUMMARY OF THE INVENTION

The present invention solves the above problems in the prior art, and provides a disk player with a disk select function, which minimizes installation space for a mechanism to eject a disk from a magazine, thereby achieving a further reduction in size of the player, which eliminates the need of providing in the magazine a separate ejector member to push out the disk, thereby simplifying the internal structure, reducing the size of the magazine and ejecting the disk reliably, and further which permits easy operation of take-out knobs provided on the magazine, thereby facilitating replacement of the disks in the magazine.

According to one aspect of the present invention, a disk player with a disk select function comprises a playback unit including a rotation mechanism for rotating a disk, a clamper for placing said disk on said rotation mechanism, and a pickup positioned to face said disk; a magazine having an opening positioned to direct toward said playback unit and accommodating a plurality of disks therein; and a disk feeding mechanism positioned in front of said opening of said magazine to feed a desired disk in said magazine toward said playback unit, wherein an ejection mechanism for protruding the desired disk through said opening is provided in said magazine, a driven part for operating said ejection mechanism is provided on the front lateral side of said magazine in the direction of insertion thereof, and a drive mechanism engaging said driven part to drive said ejection mechanism is provided on a body of said disk player.

According to another aspect of the present invention, a plurality of movable plates are movably supported in said magazine to define a plurality of disk storage spaces partitioned by said movable plates, each of said movable plates is provided with an ejector positioned to face the disk accommodated in the corresponding disk storage space from the opposite side to said opening of said magazine, and a drive mechanism for driving desired one of said movable plates in the direction for said ejector to push out the disk through said opening is provided on the body of said disk player.

According to still another aspect of the present invention, said ejection mechanism is provided in one-to-one corresponding relation to each of the disks in said magazine, and take-out knobs for operating said ejection mechanisms are positioned in a recess formed in the lateral side of said magazine such that the uppermost and lowermost ones of said take-out knobs are exposed to be operable from above and below said magazine, respectively, and the intermediate take-out knob is exposed to be operable from side of said magazine.

According to the above aspects of the present invention, since the driven part for operating the mechanism to eject the disk is provided on the front lateral side of the magazine in the direction of insertion thereof, the disk player provides the drive mechanism on the lateral side of the player body in front of the magazine to operate the driven part on the magazine. With the drive mechanism disposed in front of the magazine, the need to dispose the drive mechanism in such a manner as to extend up rearward of the magazine for taking out the disk can be eliminated and, therefore, the disk player reduced in size.

Further, according to the above aspects of the present invention, when ejecting the disk from the magazine, the corresponding movable plate is directly operated. In response to this operation of the movable plate, the ejector provided on the movable plate pushes out the disk through the opening of the magazine. Accordingly, the need to provide a separate ejector member in the magazine, essential in the prior art, can be avoided, making it possible to simplify the structure of the magazine and reduce the magazine size. Also, since the disk can be moved to a large extent with the operation of the movable plate, the length of the disk protruding from the opening can be so increased as to ensure the subsequent positive delivery of the disk. When a certain disk in the magazine is ejected, the movable plate facing that disk is moved while changing the positional relation relative to the other movable plates, so that the movable plate thus moving serves as also a guide plate for the disk. Accordingly, the disk can be more easily guided than with the conventional structure where partition plates are fixedly arranged with spacings therebetween. As a result, unlike the prior art, there is no need to control the spacing sizes between the partition plates with high precision, and increasing spacing between the partition plates more than necessary, with the result of increased thickness of the magazine.

In addition, according to the above aspects of the present invention, the uppermost and lowermost take-out knobs are exposed to be operable from above and below, respectively, and the intermediate take-out knob is exposed to be operable from the side. Therefore, the take-out knobs can be operated in three directions, making it easy to take out a disk from the magazine. By grasping the uppermost and lowermost take-out knobs from above and below and then operating all the take-out knobs together including the intermediate one, it is also easy possible to eject all the disks at a time.

BRIEF DESCRIPTION OF THE DRAWINGS

The drawings illustrate embodiments of the present invention in which:

FIG. 3 is a plan view showing a structure of a movable table and a select mechanism;

FIGS. 4(A) and 4(B) are side views showing a structure of the upper unit in different operating states;

FIG. 5 is a sectional view taken along the line V—V in FIG. 3, showing the select mechanism;

FIG. 6(A) is a front view of a shift gear shown in FIG. 5 and a drive lever driven by the shift gear;

FIG. 6(B) is an explanatory view showing an operating state of the drive lever;

FIG. 11 is an enlarged side view showing the relation between the magazine and the playback unit during the disk replacing operation; and FIGS. 12(A), 12(B) and 12(C) are explanatory views showing another embodiment of pressure contact state between an ejection/insertion roller and a lower follower roller.

DETAILED DESCRIPTION OF PREFERRED EMBODIMENTS

Figure 1:
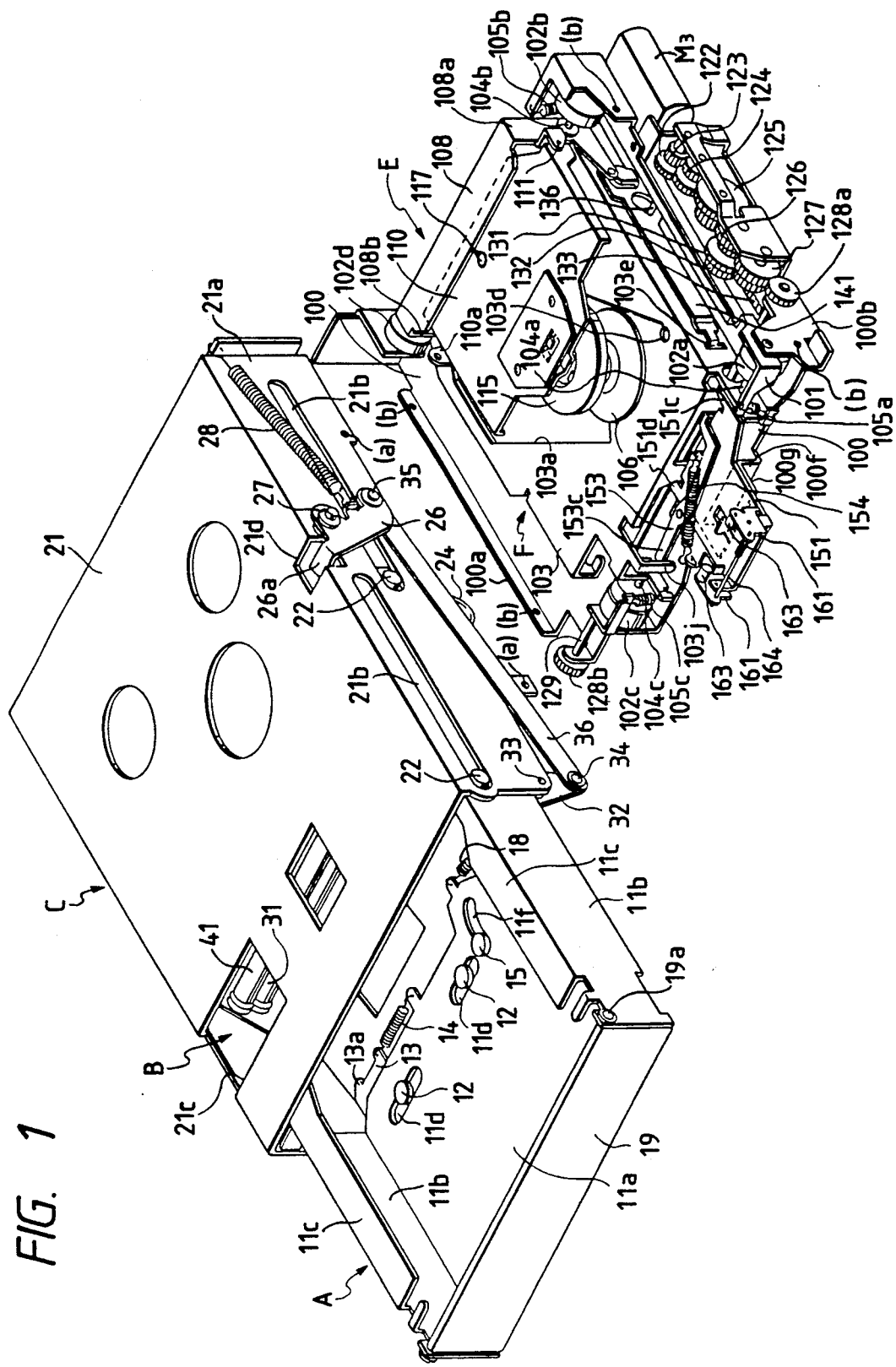
FIG. 1 is a perspective view showing a disk player unit with an upper unit and a lower unit disassembled.

Hereinafter, preferred embodiments of the present invention will be described by referring to the drawings.

FIG. 1 is an exploded perspective view of a CD player unit equipped with a disk changer, FIG. 2 is an exploded perspective view of a CD magazine to be loaded into the CD player, and other Figures subsequent to FIG. 3 show details of respective mechanisms.

In FIG. 1, denoted by reference character A is a movable table for supporting a magazine M. A select mechanism B for selecting a desired disk is mounted in the inner left side of the movable table A. C is an upper unit for supporting the movable table A in such a manner as able to advance and retract. E is a lower unit provided below the upper unit C.

A connection hole (a) is formed in each lateral side of the upper unit C and a female screwed hole (b) is formed in each lateral side of the lower unit E, so that the upper and lower units C and E are placed one above the other and fixed together by fastening a set screw through each pair of the connection hole (a) and the female screwed hole (b). In this assembled condition, the CD player unit has the size of so-called 1 DIN, i.e., 180 mm width × 50 mm height × 170 mm depth, which is suitable for installation into the same attachment space on automotive dashboards as used for a car radio or stereo set.

Figure 2A:
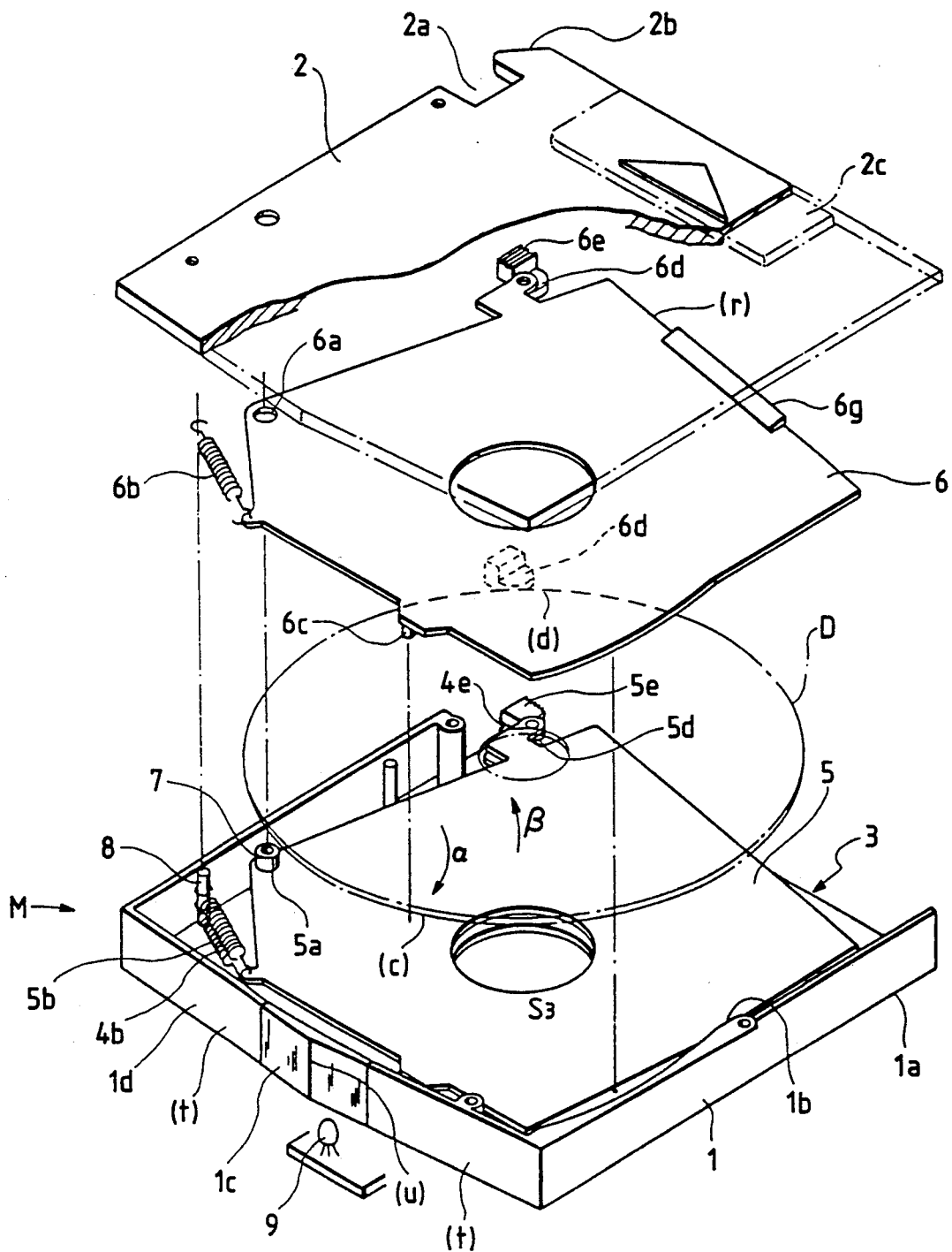
FIG. 2(A) is an exploded perspective view of a disk magazine.
Figure 2B:
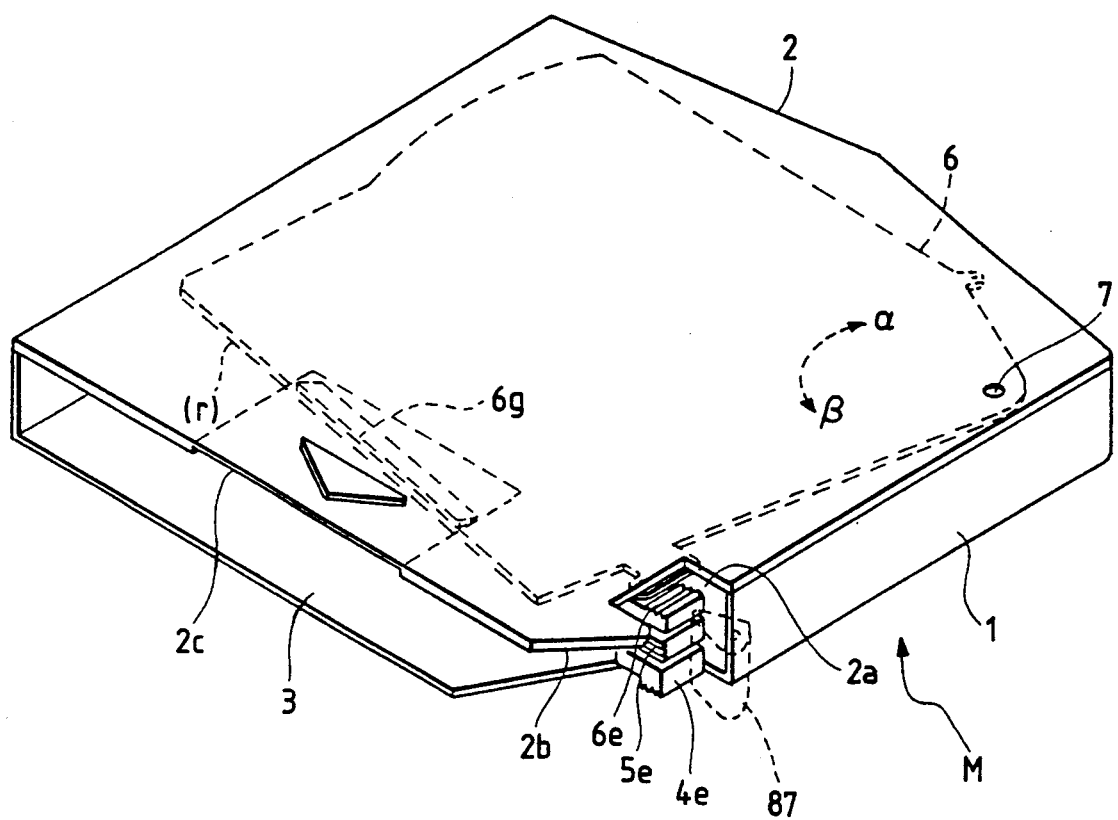
FIG. 2(B) is a perspective view of the magazine as viewed in the direction opposite to FIG. 2(A)
Figure 2C:
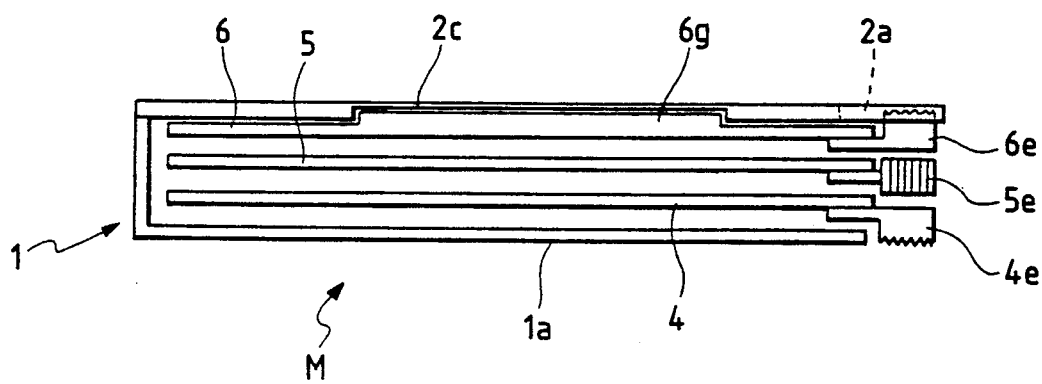
FIG. 2(C) is a side view of the magazine as viewed from the opening side.

The structure of the magazine M will be first described by referring to FIGs. 2(A), 2(B) and 2(C). The magazine M accommodates a plurality of disks D, for example, three in the illustrated embodiment. The magazine M comprises a case 1 and a cover 2. Under a condition that the case 1 and the cover 2 are fixed together, the magazine M has a box-like shape which has an opening 3 formed in the right side as viewed on FIG. 2(A) and is enclosed in other three sides. As shown in FIG. 11, three movable plates 4, 5, 6 are accommodated in the magazine M. A 1st stage disk storage space $S_1$ is defined between a bottom surface 1a of the case 1 and the movable plate 4, a 2nd stage disk storage space $S_2$ is defined between the movable plates 4 and 5, and further a 3rd stage disk storage space $S_3$ is defined between the movable plates 5 and 6. The uppermost movable plate 6 is positioned to be substantially contact or very close to the cover 2. One disk D is accommodated in each of three stages of the disk storage spaces $S_1$, $S_2$, $S_3$. FIG. 2(A) shows an exploded perspective view of the magazine M with the cover 2 and the uppermost movable plate 6 moved away, and FIG. 2(B) shows a perspective view of the magazine M in an assembled condition as viewed in a direction opposite to FIG. 2(A). FIG. 2(C) shows a side view of the magazine M as viewed from the side of the opening 3. As shown in FIG. 2(A), a shaft 7 is integrally projected from the bottom surface of the case 1 on the left side. The movable plates 4, 5, 6 are each rotatably supported by the shaft 7. FIG. 2(A) shows a condition that a support hole 5a of the movable plate 5 has been rotatably supported to the shaft 7, and a support hole 6a of the movable plate 6 is about to be inserted over the shaft 7. A pin 8 projecting from the bottom surface 1a of the case 1 is provided at a position next the shaft 7. Springs 4b, 5b, 6b are stretched between the movable plates 4, 5, 6 and the pin 8, respectively, for urging the movable plates 4, 5, 6, in the direction α by their resilient forces. Ejection pins 4c, 5c, 6c are provided to project downwardly from rear portions or edges of the movable plates 4, 5, 6, respectively. Presser members 4d, 5d, 6d and take-out knobs 4e, 5e, 6e integral therewith are provided in the front left sides of the movable plates 4, 5, 6, respectively. The positional relation between the ejector pins, the presser members and the take-out knobs will be explained in connection with the uppermost movable plate 6 appearing in FIG. 2(A). The ejector pin 6c projecting downwardly from the rear portion of the movable plate 6 is located on the rear side of the 3rd stage disk storage space $S_3$ in opposition to a position indicated by (c) corresponding to the rear edge of the disk D accommodated in the space $S_3$. With the disk D accommodated in the space $S_3$, the presser member 6d is located in opposition to a position indicated by (d) corresponding to the front edge of the disk D. For convenience of description, the condition that the presser member 6d is facing the disk D is indicated by chain lines in FIG. 2(A).

In the magazine M, the movable plate 6 is normally turned in the direction α by the urging force of the spring 6b. Therefore, when the disk D is inserted into the space $S_3$ through the opening 3, the presser member 6d is once pushed by the resultant insertion force to retreat the movable plate in the direction β, allowing the disk D to be inserted into the space $S_3$. After the insertion, the movable plate 6 restores in the direction α by the urging force of the spring 6b, so that the presser member 6d presses the disk D at the position indicated by (d) to prevent the disk D from being slipped off out of the space $S_3$. When the disk D in the space $S_3$ is selected and ejected, the presser member 6d is driven by the select mechanism B (described later) in the direction β. At the same time, the ejector pin 6c pushes the disk D at the portion indicated by (c) toward the opening 3. At this time, the movable plate 6 moves in the direction β while developing a circular motion about the shaft 7. With this circular motion, the disk D is forced to slide along an inner wall 1b of the case 1, causing the front end of the disk to project through the opening 3. As shown in FIGS. 2(A) and 2(B), a front side or edge (r) of the movable plate 6 facing the opening 3 is inclined with respect to the side or edge of the magazine M defining the opening 3 under a condition that the movable plate 6 is rotated in the direction α. Accordingly, when the movable plate 6 is turned in the direction β for ejecting the disk, the front side (r) of the movable plate 6 will not project from the opening 3. Such a shape of the movable plate and the operations of inserting and ejecting the disk are equally applied to the disk storage spaces $S_1$ and $S_2$. Specifically, the movable plate 4 in the space $S_1$ serves to prevent the slip-off of the disk and eject the disk, while the movable plate 5 in the space $S_2$ performs the similar operations.

The take-out knob 6e integral with the presser member 6d, the take-out knob 5e integral with the presser member 5e, and the take-out knob 4e provided on the lowermost movable plate 4 are projected laterally of the case 1. As shown in FIGS. 2(B) and 2(C), those take-out knobs 4e, 5e, 6e are projecting into a recess 2a formed in the corresponding lateral side of the cover 2. The take-out knobs 4e, 5e, 6e are used when manually taking out the respective disks D. At this time, since the three take-out knobs 4e, 5e, 6e are exposed to the recess 2a, they can be operated in three directions, i.e., from below, side and above. In other words, the knobs 4e and 6e can be operated by the finger from below and above, respectively, and the knob 5e can be operated by the finger from side. When replacing any one of the disks in the magazine M with a new one, for example, the desired disk D can be ejected from the space $S_1$, $S_2$ or $S_3$ through the ejector pin 4c, 5c or 6c by manually operating the take-out knob 4e, 5e or 6e to turn the movable plate 4, 5 or 6 in the direction β. The cover 2 is formed with an inclined surface 2b in front of the portion where the recess 2a is defined (on the left side in FIG. 2(A)). The provision of the inclined surface 2b can prevent the knobs 4e, 5e, 6e from striking against other members in the player unit when the magazine M is inserted, and hence prevent the movable plates from being driven erroneously.

As shown in FIG. 11, inclined surfaces 4f, 5f, 6f are formed in the respective front sides (r) of the movable plates 4, 5, 6 on the same side as the opening 3. Since a disk ejecting/inserting mechanism (described later) is arranged such that the disks D are returned to the spaces $S_1$ and $S_2$ from somewhat above and to the space $S_3$ almost horizontally as shown by arrows in FIG. 11, the inclined surfaces 4f, 5f, 6f serve to increase the opening areas defined below the front sides of the movable plates 4, 5, 6, allowing the disks D to be easily guided into the respective spaces.

As shown in FIGS. 2(A), 2(B) and 2(C), the inner wall of the cover 2 near the opening 3 is thinned to form a recess 2c. On the other hand, a projection is integrally formed on the uppermost movable plate 6 at the front end facing the opening 3 to serve as a disk insertion preventing portion 6g. While the uppermost movable plate 6 is in contact or very close relation to the inner wall of the cover 2, the disk insertion preventing portion 6g is penetrating into the recess 2c of the cover 2. Accordingly, the disk is returned into the magazine M in the condition of FIG. 11, the disk to be returned into the uppermost disk storage space $S_3$ can be prevented from erroneously entering the gap between the movable plate 6 and the inner wall of the cover 2.

In the embodiment shown in FIGS. 2(A), 2(B) and 2(C), the recess 2c of the cover 2 is formed in only the central portion so as to prevent a reduction in the strength of the cover 2 due to thinning of the wall. Where the cover wall has a large thickness, however, the recess 2c and the disk insertion preventing portion 6g may be formed throughout the width of the opening 3. Further, where the movable plate 6 is formed of a metal sheet, the front end of the metal sheet may be bent obliquely upwardly so that the bent portions doubles as the inclined surface 6f and the disk insertion preventing portion 6g. As an alternative, a cutout may be formed in the cover 2 in place of the recess 2c and the disk insertion preventing portion 6g may be provided to expose through the cutout.

Moreover, as shown in FIG. 2(A), a window is formed in a rear end wall (i.e. a surface facing the outside of the player unit) 1d of the case 1 of the magazine M and a lens 1c is fitted in the window, allowing a user to confirm from the outside how many disks are accommodated in the magazine or in which spaces disks are accommodated.

The lens 1c fitted in the rear end wall 1d on the side opposite to the opening 3 of the magazine M is formed of a light transmittable member. The light transmittable member is transparent or translucent and has a structure capable of easily introducing light into the interior of the magazine through diffused reflection. Under a condition that the magazine M held on the movable table A is accommodated in the upper unit C as shown in FIG. 4(B), a light emitting device 9 is positioned to face the lens 1c from below for illuminating the lens 1c. In this player unit, the magazine M is once projected from the upper unit C along with the movable table A during the disk displacement operation. Therefore, by blinking the light emitting device 9 to intermittently illuminate the lens 1c just before the projection of the magazine M, for example, it is possible to inform the user of an operating state or give the user an operating feeling in match with a unique function, thereby increasing a commodity value. Alternatively, the rear end wall 1d may be entirely formed of light transmittable member to illuminate the whole of the rear end face by a light emitting device.

Figure 7:
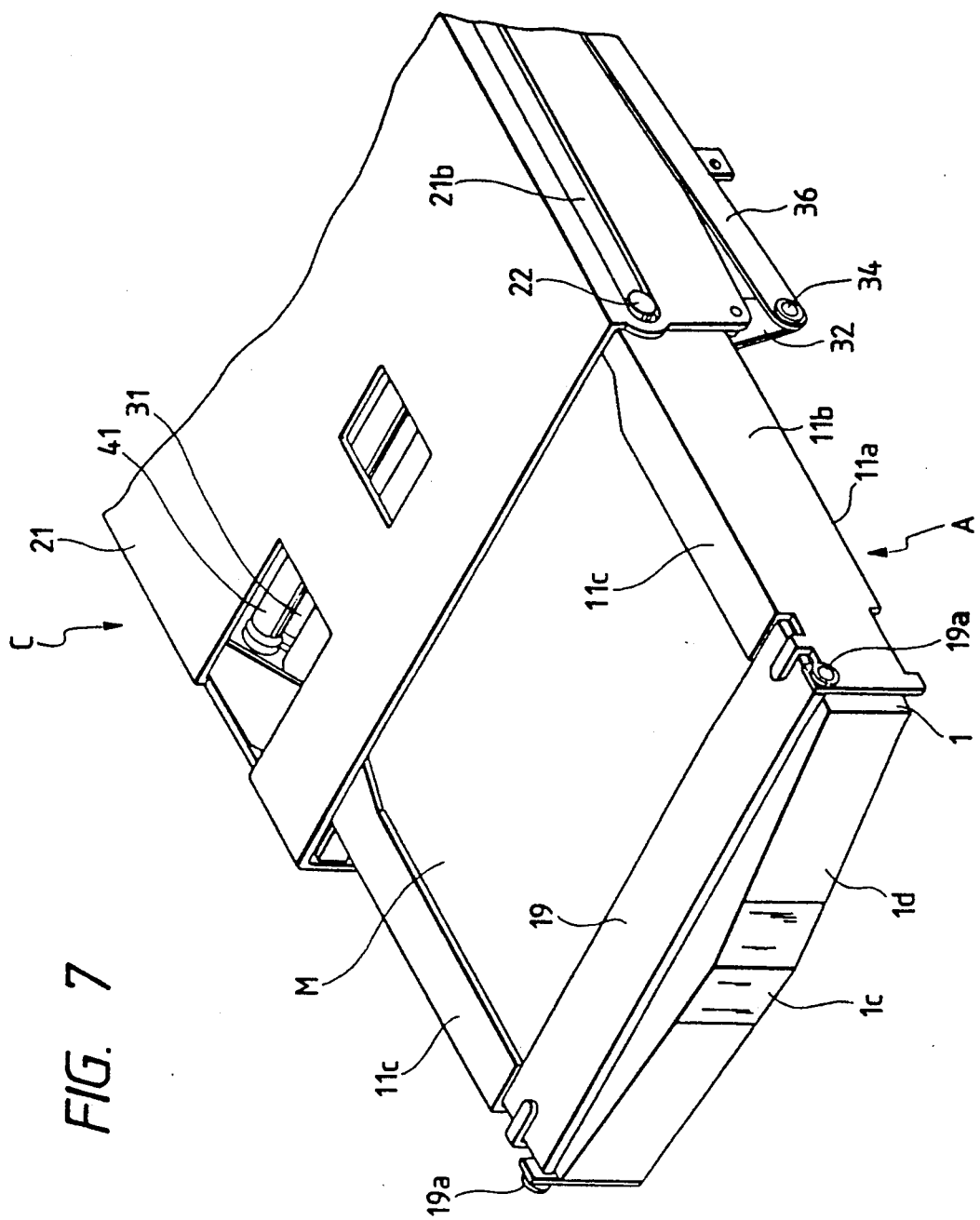
FIG. 7 is a perspective view showing the disk replacing operation in a state that the movable table is protruded.

With regards to the outer configuration of the magazine M, as shown in FIGS. 2(A), 2(B) and 7, the rear end wall 1d has a substantially triangular peaked shape with the central portion projecting toward the user. In a loaded state, i.e., under a condition that the magazine M is retracted in the upper unit C along with the movable table A as shown in FIG. 4(B), such a peaked shape of the rear end wall 1d leads to that both side faces (t) of the peaked shape provide inclined surfaces approaching toward a body of the player unit, allowing the user to easily view a panel, located below the magazine loading section, from above through the front of the side faces (t) on both sides of an apex (u) of the peaked shape. Consequently, the visual field for indications on the player panel will not be interfered with the magazine M loaded in place. Further, since the user can grasp the projected end of the magazine corresponding to the apex (u) of the peaked shape by the fingers from above and below, it becomes easy to hold the magazine M at the time of loading the magazine M and taking out it after ejection. Also, the peaked shape of the rear end wall 1d makes the user easily recognize the direction in which the magazine M is to be inserted, and thus can prevent false insertion of the magazine M.

The structure of the upper unit C including the movable table A and the select mechanism B will be next described.

FIG. 3 is a plan view of the upper unit C and FIGS. 4(A) and 4(B) are side views in different operating states.

The movable table A has a bottom plate 11a, a pair of side plates 11b upwardly bent at both sides of the bottom plate 11a, and a pair of upper guide plates 11c horizontally bent from respective upper edges of the side plates 11b. A door 19 is provided between and in front of the side plates 11b (see FIG. 1). The door 19 is supported on shafts 19a to be pivotally opened inwardly. While the movable table A is projecting out of the upper unit C in FIG. 1, the door 19 is positioned substantially in flush with the front surface of a housing adapted to accommodate the CD player unit therein, when the movable table A is retracted in the upper unit C as shown in FIG. 4(B). In other words, when the movable table A is retracted, an insertion entrance for the magazine M is given by the portion or opening closed by the door 19. The magazine M is inserted through the insertion entrance when the movable table A is retracted in the upper unit C. After the insertion, the door 19 is kept in an inwardly turned state (see FIG. 7). The inserted magazine M is locked by a lock mechanism (described later) in the movable table A and, since then, the magazine M and the movable table A are held together until ejection of the magazine M.

As shown in FIGS. 1 and 3, a pair of slide holes 11d are bored in the bottom plate 11a of the movable plate A, and two lock pins 12 are projected upwardly through the slide holes 11d, respectively. On the underside of the bottom plate 11a, a lock lever 13 is provided to support the pair of lock pins 12. A spring 14 is stretched between the lock lever 13 and a projection 11e provided at the inner end of the bottom plate 11a for urging the lock lever 13 and the lock pins 12 in the direction (e) by a resilient force. The lock lever 13 is provided with a projection 13a in its upper portion as viewed on FIG. 3. An arcuate guide hole 11f is also bored in the bottom plate 11a of the movable table A, and an eject pin 15 is projected upwardly through the guide hole 11f. On the underside of the bottom plate 11a, an eject lever 16 supporting the eject pin 15 is supported by a pin 17 to be pivotal thereabout. A spring 18 is stretched between the eject lever 16 and a projection 11g provided at the inner end of the bottom plate 11a for urging the eject lever 13 and the lock pins 15 in the direction (f) by a resilient force.

As shown in FIG. 3, the bottom plate 1a of the magazine M to be loaded into the movable table A is formed on the underside thereof with a pair of guide slope 1e and lock groove 1f in continuation and another pair of guide slope 1g and lock groove 1h in continuation. A presser step 1i is formed laterally of the guide slope 1g. The guide slops 1e, 1g, the lock grooves 1f, 1h and the presser step 1i are formed on the underside of the bottom plate 1a of the case 1 for the magazine M and their configurations will not appear on the inner side of the case 1.

The lock operation for locking the magazine M when it is loaded into the movable table A and the eject operation for ejecting the magazine M from the movable table A are carried out under a condition that the movable table A is retracted in the upper unit C as shown in FIG. 4(B). When the magazine M is inserted while pushing the door 19 to open it in that condition, the guide slopes 1e and 1g on the underside of the case 1 move the lock pins 12 in the direction opposite to (e). With further insertion of the magazine M, the lock lever 13 is pulled by the resilient force of the spring 14 in the direction (e), whereupon the lock pins 12 enter the lock grooves 1f and 1h to lock the magazine M in the movable table A. At this time, the eject pin 15 is pushed by the presser step 1i in the direction opposite to (f) so that the resilient force of the spring 18 acts in the direction of ejecting the magazine M. Under the condition that the movable table A is retracted in the upper unit C, when the projection 13a of the lock lever 13 is pushed by a later-described mechanism in the direction opposite to (e), the lock pins 12 are dislodged from the lock grooves 1f and 1h to be released from a locked state, whereupon the eject pin 15 pushes the presser step 1i by the resilient force of the spring 18 so that the magazine M is ejected from the movable table A leftwardly in FIG. 3.

As shown in FIG. 1, a cover 21 of the upper unit C is formed by bending a metal sheet into an inverted-channel shape. A pair of parallel guide grooves 21b are defined in one side plate 21a of the cover 21. The movable table A has slide pins 22 provided on the outer surface of the side plate 11b, and these slide pins 22 are inserted in the guide grooves 21b, respectively, allowing the movable table A to move in the directions of retracting and protruding relative to the cover 21 while being guided by the guide grooves 21b. Similar guide grooves are also defined in a side plate 21c of the cover 21 on the opposite side so as to guide slide pins provided on the side plate 11b of the movable table A in a like manner.

As shown in FIGS. 1 and 4(A), a feed gear 24 supported by a shaft 23 is provided near the lower edge of the side plate 21a of the cover 21. On the other hand, a rack 11k is formed along the lower edge of the side plate 11b of the movable table A and held in mesh with the feed gear 24. When power is transmitted to the feed gear 24 through a later-described path from the lower unit E positioned below the upper unit C, the power is further transmitted to the rack 11k for driving the movable table A to retract into or protrude from the cover 21 of the upper unit C. Likewise, another feed gear is also provided to the side plate 21c of the cover 21 on the opposite side, whereby the feed power is transmitted to the side plate 11c of the movable table A through that feed gear on the side of the side plate 21c as well.

As shown in FIGS. 1, 4(A) and 4(B), a lock plate 26 is rotatably supported by a shaft 27 on the side plate 21a of the cover 21 of the upper unit C, the lock plate 25 being urged by a spring 28 counterclockwise. A cutout 21d is formed at the upper end of the side plate 21a with a bent portion 26a at the distal end of the lock plate 26 fitted in the cutout 21d. Under a condition that the lock plate 26 is turned counterclockwise as shown in FIG. 4(A), the bent portion 26a is positioned facing a portion of the rear end of the movable table A indicated by (g), to thereby prevent the movable table A from further moving into the cover 21. As described later, when any of the disks D in the magazine M is being selected and drawn out, the movable table A and the magazine M are projecting to the left, on the drawing, relative to the upper unit C as shown in FIG. 4(A). During such select and draw-out operations, the bent portion 26a of the lock plate 26 is positioned facing the rear end of the movable table A to prevent the movable table A entering the upper unit C even if it is pushed erroneously. During other operations in which the movable table A is to be retracted into the cover 21, the lock plate 26 is driven clockwise to disengage the bent portion 26a from the rear end of the movable table A, allowing the movable table A to further move into the cover 21.

The position of the lock plate 26 is controlled in relation to the position of a lower follower roller 31 used for drawing the disk D out of the magazine M. More specifically, as shown in FIG. 4(A), the lower follower roller 31 within the cover 21 is held by a roller holder 32 which is rotatably supported by pins 33 to the side plate 21a of the cover 21 and the side plate 21c on the opposite side. A pin 34 provided on the roller holder 32 and a pin 35 provided on the lock plate 26 are interconnected by a joint link 36. The height or level of the lower follower roller 31 is determined by the level of an ejection/insertion roller 41 which is brought into contact from above. The lock plate 26 is urged by the spring 28 counterclockwise and this urging force is transmitted to the roller holder 32 through the joint link 36 so that the roller holder 32 is urged counterclockwise, i.e., in the direction in which the lower follower roller 31 is brought into contact with the ejection/insertion roller 41. Therefore, by changing the vertical position of the ejection/insertion roller 41, the turning attitude of the roller holder 32 is also changed correspondingly to control an attitude of the lock plate 26 through the joint link 36. Stated otherwise, when the ejection/insertion roller 41 is lowered, the lock plate 26 is turned clockwise and when the ejection/insertion roller 41 is raised, the lock plate 26 is turned counterclockwise.

Further, when the movable table A penetrates into the cover 21 as shown in FIG. 4(B), the bent portion 26a of the lock plate 26 slides over the upper edge of the side plate 11b of the movable table A, whereupon the lock plate 26 is turned clockwise to a large extent. Accordingly, the roller holder 32 is driven clockwise through the joint link 36 and the lower follower roller 31 is retreated downwardly. In other words, the disk D is ejected from and inserted into the magazine M by the rollers 31 and 41 under the condition shown in FIG. 4(A). In other conditions (mainly in a condition of playing back the music) where the movable table A enters the cover 21, the lower follower roller 31 is retreated downwardly to a large extent.

The structure of the select mechanism B located inwardly of the movable table A on the upper side in FIG. 3 will be next described.

FIG. 5 is a sectional view taken along the line V—V in FIG. 3 for explaining the structure of the select mechanism B.

As shown in FIGS. 3 and 5, the ejection/insertion roller 41 is supported by a swing lever 42. A mechanism base 40 is fixedly extended from the side plate 11b of the movable table A shown as located on the upper side in FIG. 3, and the swing lever 42 is rotatably supported to the distal end of a shaft 43 in turn secured to the mechanism base 40. As shown in the lower side of FIG. 3, the opposite side of the swing lever 42 is rotatably supported by a pin 44 to the side plate 11b of the movable table A on the lower side. As will be seen from FIG. 5, an elevator block 45 capable of vertically moving is provided on the mechanism base 40. A roller joint lever 47 is rotatably supported by a pin 46 provided on the elevator block 45, and has the distal end coupled to the joint of the ejection/insertion roller 41.

The elevator block 45 is lifted and lowered while being guided by a guide shaft 53 extending vertically in FIG. 5. A nut member 48 is supported on the elevator block 45 and held in mesh a drive screw 49. The drive screw 49 extends in parallel to the guide shaft 53 with a worm wheel 51 fixed to a lower portion of the drive screw 49. A lifting/lowering motor $M_1$ is mounted to the mechanism base 40, and a worm 52 provided on a rotating shaft of the motor $M_1$ is held in mesh with the worm wheel 51. When the worm wheel 51 and the drive screw 49 are driven by the motor $M_1$, the elevator block 45 is lifted and lowered through a distance corresponding the number of revolutions. Upon this lifting and lowering movement, the ejection/insertion roller 41 is also lifted and lowered via the roller joint lever 47, whereby the swing lever 42 is angularly moved about the shaft 43 to determine the vertical position of the ejection/insertion roller 41 on the drawing.

When the ejection/insertion roller 41 is angularly driven by the motor $M_1$ about the shaft 43, the ejection/insertion roller 41 is thereby shifted to any of positions shown in the left side of FIG. 11. Under the condition shown in FIGS. 4(A) and 11, since the lower follower roller 31 is held in pressure contact with the ejection/insertion roller 41 by the resilient force of the spring 28 urging the lock plate 26, the lower follower roller 31 is forced to follow the lifting and lowering movement of the ejection/insertion roller 41. In FIG. 11, the level (0) of the ejection/insertion roller 41 represents an original position, the level (1) a 1st stage select position, the level (2) a 2nd stage select position, and the level (3) a 3rd stage select position, respectively. The original position indicated by (0) corresponds to a position such as used for the eject operation of the magazine. The eject operation is carried out only the condition of FIG. 4(B) where the lower follower roller 31 is detached from the ejection/insertion roller 41. The level (1) corresponds to a position of ejecting and inserting the disk D in the 1st disk storage space $S_1$ of the magazine M, the level (2) corresponds to a position of ejecting and inserting the disk D in the 2nd disk storage space $S_2$, and further the level (3) corresponds to a position of ejecting and inserting the disk D in the 3rd disk storage space $S_3$. Any of those positions can be assumed by controlling the number of revolutions of the motor $M_1$ shown in FIG. 5.

A sensor rotator 55 for the above control is rotatably provided over a lower portion of the guide shaft 53 shown in FIG. 5. The sensor rotator 55 is formed along its circumference with teeth which are held in mesh with a gear 54 integral with the worm wheel 51. The sensor rotator 55 has formed therein a pair of sensor holes as shown in FIG. 3, and these sensor holes are detected by an optical sensor 56 twice per rotation. A sensor arm 45a extending to the right in FIG. 5 is attached to the elevator block 45 with a sensor switch $SW_1$ located below the sensor arm 45a in opposite relation.

When the drive screw 49 is driven by the motor $M_1$ and the elevator block 45 is so lowered that the sensor arm 45a turns on the sensor switch $SW_1$, the ejection-/insertion roller 41 assumes the original position indicated by (0) in FIG. 11. When the worm wheel 51 is driven by the motor $M_1$ to lift the elevator block 45 from the original position, the sensor rotator 55 is driven by the gear 54 integral with the worm wheel 51, causing the optical sensor 56 to issues a detection output per sensing hole. In the case where two sensor holes are defined in the sensor rotator 55, when the sensor rotator 55 starts rotating from the original position and the optical sensor 56 issues 11 pulses of detection output, for example, the ejection/insertion roller 41 assumes the 1st select position (1). When the optical sensor 56 issues another 7 pulses of detection output starting from the 1st select position (1), the ejection/insertion roller 41 assumes the 2nd select position (2). After yet another 7 pulses, the ejection/insertion roller 41 assumes the 3rd select position (3). In this way, the vertical positions of the elevator block 45 and hence of the ejection/insertion roller 41 can be controlled based on the detection outputs from the sensor switch $SW_1$ and the optical sensor 56.

As shown in FIGS. 3 and 5, a motor $M_2$ is provided at the right end of the mechanism base 40. Power of the motor $M_2$ is transmitted from a worm 61 to a worm wheel 62 and then to a gear 64 via a gear 63. The gear 64 is coupled to a roller drive gear 66 through a clutch mechansim having a spring 65. The gear 64 and the roller drive gear 66 are rotatably mounted on the shaft 43 which supports the swing lever 42. Rotative power or torque of the roller drive gear 66 is transmitted to a follower gear 69, fixed to the shaft of the ejection/insertion roller 41, via reduction gears 67 and 68 provided on the side face of the swing lever 42. In short, the power is transmitted from the motor $M_2$ to the ejection/insertion roller 41 via the respective gears and the clutch mechanism, whereby the disk D is taken out of the magazine M upon the counterclockwise rotation of the ejection/insertion roller 41 in FIG. 11 and is returned into the magazine M upon the clockwise rotation thereof.

A transmission gear 72 supported on the mechanism base 40 is held in mesh with the gear 71 integral with the gear 64, and a gear 73 integral with the transmission gear 72 is held in mesh with a larger-diameter shift gear 74. As shown in FIG. 5, the shift gear 74 is rotatably supported by a shaft 76 provided on the mechanism base 40 and has a cam 75 integral therewith. The cam 75 is formed integrally with the shift gear 74 on the upper side in FIG. 3 or on the rear side in FIG. 5. The cam 75 is sectoral or semicircular in shape.

As shown in FIG. 3, a drive lever 81 is supported on the inner surface of the mechanism base 40 to be movable in the directions (h) and (i). To avoid the overlapped depiction in FIG. 5, the drive lever 81 is shown in FIG. 6(A) independently. Elongate holes 81a and 81b are bored in the drive lever 81. One elongate hole 81a is guided by the shaft 76 supporting the shift gear 74 and the other elongate hole 81b is guided by a guide pin 82 provided on the mechanism base 40, allowing the drive lever 81 to move in the directions (h) and (i). Also, the drive lever 81 is urged by a spring 83 in the direction (h). A drive piece 81c is formed by bending the right end of the drive lever 81 as viewed on the drawing, and is positioned on the right side of the cam 75. A holder 81d is formed by bending the left end of the drive lever 81 as viewed on the drawing. Another plate member 84 is superposed over the drive lever 81 on the right side of the holder 81d and has a bent piece 84a at the right end thereof. As shown in FIG. 5, the mechanism base 40 is provided with a guide shaft 85 in parallel to the drive screw 49 and a shifter 86 is supported on the guide shaft 85. The shifter 86 is held by the elevator block 45 to be lifted and lowered therewith, while it is also rotatable about the guide shaft 85. As shown in FIG. 3, one arm 86a of the shifter 86 is interposed between the holder 81d at the left end of the drive lever 81 and the bent piece 84a so that the shifter 86 is driven clockwise in FIG. 3 upon the movement of the drive lever 81 in the direction (i). The shifter 86 also has the other drive arm 86b. As will be seen from FIG. 5, the drive arm 86b is located facing the projection 13a of the lock lever 13 provided on the underside of the bottom plate 11a of the movable plate A. FIG. 5 shows a condition that the elevator block 45 is at a position where the ejection/insertion roller 41 is caused to assume the original position (0) as shown in FIG. 11. When the elevator block 45 is lifted by the power of the motor $M_1$ and the ejection/insertion roller 41 is moved to any of the 1st stage select position (1) to the 3rd stage select position (3) shown in FIG. 11, the drive arm 86b of the shifter 86 is thereby disengaged from the projection 13a of the lock lever 13 upwardly and positioned facing corresponding one of the presser members 4d, 5d, 6d (see FIG. 2) of the loaded magazine M from the inner side. A restrictor 87 is rotatably supported to the holder 81d provided at the left end of the drive lever 81, and is urged by a spring 88 (FIG. 6(B)) so as to maintain the attitude shown in FIG. 3. When the magazine M is loaded, the restrictor 87 is positioned facing the presser members 4d, 5d, 6d and the take-out knobs 4e, 5e, 6e from the outer side as indicated by broken lines in FIG. 2(B), so that it restricts the movable plates 4, 5, 6 in the magazine M from turning in the direction β other than the operation of taking out or inserting the disk, and thus prevents the disks D in the magazine M from slipping off through the opening 3 due to shocks.

In the condition of FIGS. 3 and 6(A), the drive lever 81 is moved by the spring 83 in the direction (h). When the shift gear 74 is rotated 360 degrees clockwise or counterclockwise from that condition, the drive lever 81 is driven by the cam 75 in the direction (i) at a first step of the operation as shown in FIG. 6(B). Thereupon, the shifter 86 sandwiched between the holder 81d and the bent piece 84a is driven clockwise in FIG. 3, and the restrictor 87 is also fallen clockwise by the drive arm 86b of the shifter 86. As a result, the restrictor 87 is moved aside from the position facing the take-out knobs 4e, 5e, 6e, allowing the movable plates 4, 5, 6 to be now turned in the direction β. At this time, if the level of the elevator block 45 is at the original position (0), the lock lever 13 of the movable table A is driven by the drive arm 86b of the shifter 86. If it is at any of the 1st stage select position (1) to the 3rd stage select position (3), corresponding one of the presser members 4d, 5d, 6d shown in FIG. 2 is driven by the drive arm 86b, whereby the movable plate 4, 5 or 6 is driven in the direction β, causing the ejector pin 4c, 5c or 6c to eject the disk D in the magazine M through the opening 3. With further rotation of the shift gear 74, the drive lever 81 remains the same position since the condition of FIG. 6(B). Then, upon reaching the rotating angle of 360 degrees, the drive lever 81 is returned to the position of FIG. 6(A).

The power of the motor $M_2$ is transmitted not only to the shift gear 74, but also to the ejection/insertion roller 41 as mentioned above. Thus, while the shift gear 74 is rotated 360 degrees by the motor $M_2$, the ejection/insertion roller 41 is also driven. The relation between both power transmission paths is as follows.

First, during the operation of taking out the disk in the magazine M, the motor $M_2$ continues rotating the ejection/insertion roller 41 counterclockwise, while the shift gear 74 is rotated 360 degrees clockwise. Accordingly, the drive lever 81 is first pulled in the direction (i) to turn the shifter 86 clockwise and, thereafter, the drive lever 81 and hence the shifter 86 remain as they are. After the shift gear 74 rotates 360 degrees, the drive lever 81 is restored in the direction (h) and the shifter 85 is returned to the attitude shown in FIG. 3. When returning the disk into the magazine M, the motor $M_2$ is rotated in the reversed direction such that the ejection/insertion roller 41 continues rotating clockwise, while the shift gear 74 is rotated 360 degrees counterclockwise. At this time, the drive lever 81 is once pushed in the direction (i) and then restored in the direction (h) after the rotation through 360 degrees.

The structure of the lower unit E will be next described.

Figure 8:
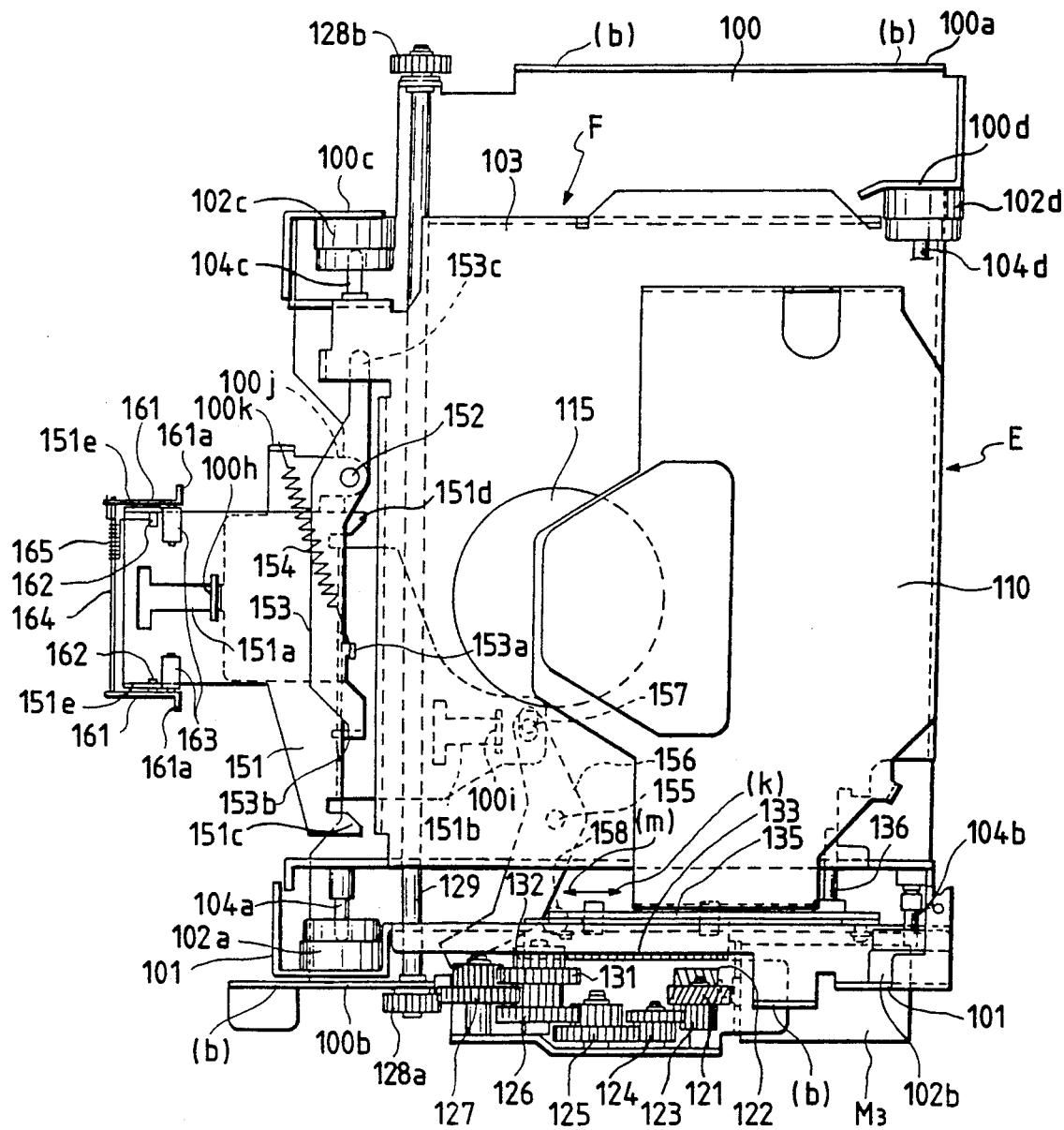
FIG. 8 is a plan view of the lower unit.

FIG. 8 shows a plan view of the lower unit E. A base 100 of the lower unit E has a bent portion 100a formed at the upper end of the base 100 and a bent portion 100b formed by perpendicularly bending the lower end of the base 100, as viewed on FIG. 8. A sub-base 101 is fixed to the inner side of the lower bent portion 100b. The female screwed holes (b), with which the side plates 21a and 21c of the cover 21 of the upper unit C are screwed to the lower unit E, are defined two in the bent portion 100a, one in the bent portion 100b and one in the sub-base 101. Dampers 102a and 102b are supported to the inner side of the sub-base 101, whereas dampers 102c and 102d are provided to bent portions 100c and 100d of the base 100 shown in the upper side of FIG. 8, respectively, so that the playback unit F is mounted in elastically floated fashion by the dampers 102a to 102d. More specifically, support shafts 104a, 104b, 104c, 104d provided on a chassis 103 of the playback unit F are inserted to the dampers 102a to 102d, respectively. Each damper comprises, for example, a rubber-made bag of which interior is filled with air or other fluid in a sealed manner. Furthermore, as shown in FIG. 1, the chassis 103 of the playback unit F is suspended from the base 100 or the sub-base 101 by a plurality of coil springs 105a, 105b, 105c. Thus, the playback unit F is supported via the dampers and the coil springs to reduce an adverse influence caused by vibrations of the automotive body reaching the playback unit.

As shown in FIG. 1, a turntable 101 is disposed substantially at the center of the chassis 103 of the playback unit F. The turntable 106 supports the disk D drawn out of the magazine M for driving the disk to rotate it, and is driven to rotate by a motor mounted on the underside of the chassis 103. A light pickup (not shown) is provided within a cutout 103a defined in the chassis 103 as shown in FIG. 1. The light pickup is moved along the recording surface of the disk D loaded over the turntable 106 for thereby playing back the music.

Figure 9A:
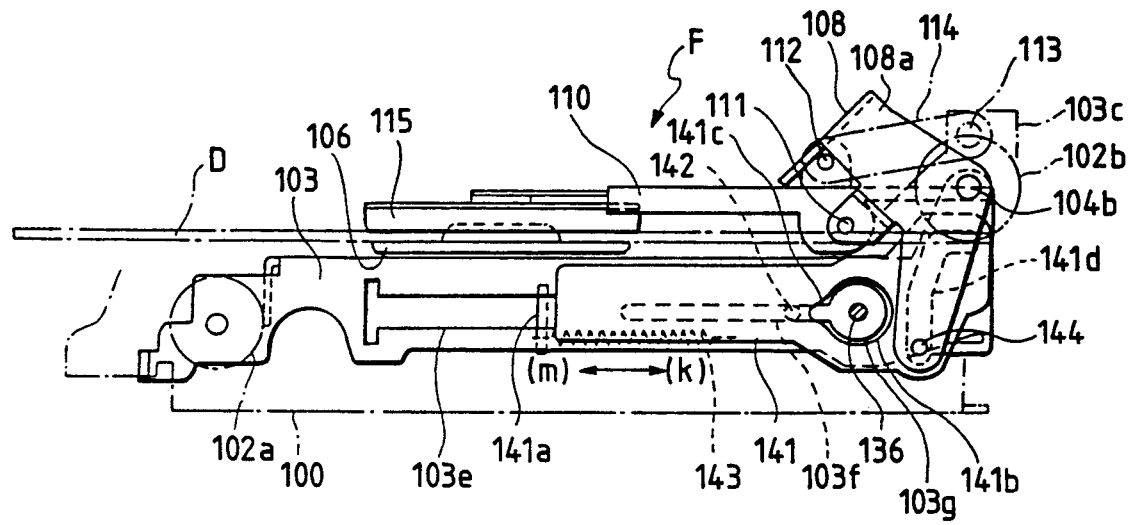
FIGS. 9(A) and 9(B) are side views of a playback unit provided on the lower unit in different operating states.
Figure 9B:
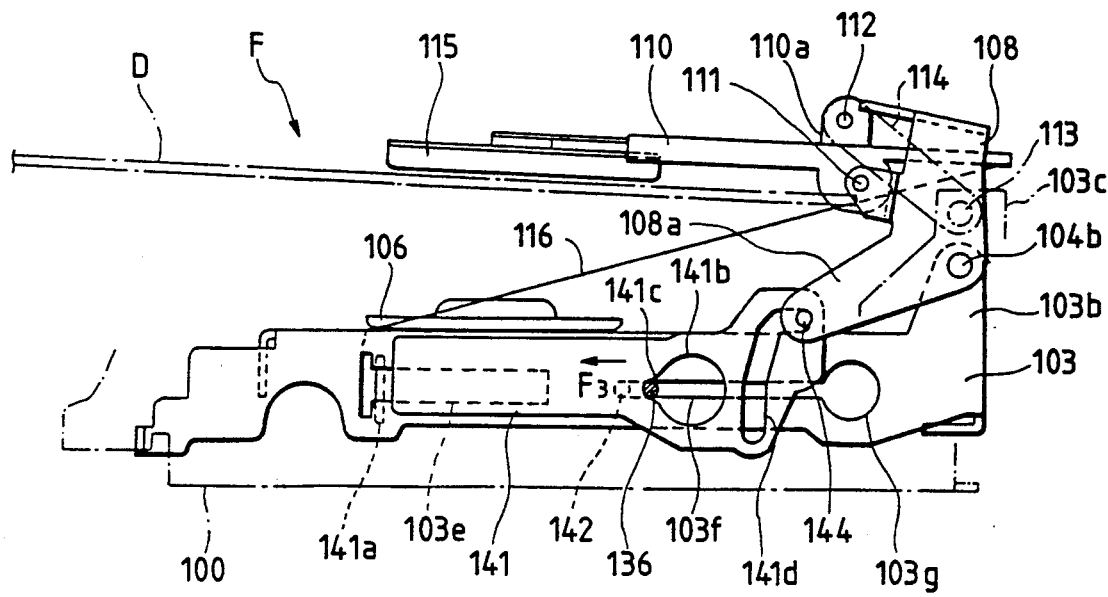

FIGS. 9(A), 9(B) and 11 show, from the side, the playback unit F elastically supported by the base 100 and others as mentioned above. FIG. 9(A) shows a playback state where the disk D is clamped to play back the music, and FIGS. 9(B) and 11 shows a standby (unclamped) state where the disk D is not clamped.

As detailed in FIG. 9(B), a support projection 103b extending upwardly is provided integrally with the side wall of the chassis 103 of the playback unit F in the foremost side on the drawing toward the observer, and a support shaft 104b to be inserted to the damper 102b is fixed to the support projection 103b. As shown in FIG. 1, a drive link 108 having a substantially inverted-C or channel-like shape in cross-section is provided on the chassis 103 and has both side end portions bent at a right angle. One bent portion 108a is rotatably supported on the support shaft 104b. Likewise, the other bent portion 108b is rotatably supported on the support shaft 104d inserted to the other damper 102d. The shaft 104d is fixed to a support projection 103c, indicated by chain lines, provided on the side wall of the chassis 103 opposite to the support projection 103b.

A clamp arm 110 is provided above the chassis 103 to extend in opposite relation. A pin 111 is provided on one side wall (in the foremost side on FIGS. 9(A) and 9(B) toward the observer) of the clamp arm 110, and is rotatably supported by the bent portion 108a of the drive link 108. Also, in FIGS. 9(A) and 9(B), a projection 110a is provided at the rearmost side of the clamp arm 110 as viewed in the direction perpendicular to the drawing sheet. A link 114 is coupled between a pin 112 provided on the projection 110a and a pin 113 provided on the support projection 103c upstanding on the chassis 103. When the drive link 108 is turned by a later-described mechanism about the support shafts 104b and 104d, the support shaft 104b and the pins 111, 112 and 113 jointly establish the relation of a parallel link, whereby the clamp arm 110 is allowed to lift and lower while keeping a substantially horizontal attitude with respect to the chassis 103 of the playback unit F. A clamper 115 is rotatably supported to the underside of the clamp arm 110 at its distal portion. A magnet is built in the clamper 115 so that when the clamp arm 110 is descended, the clamper 115 is magnetically attracted to the metal-made turntable 106. The disk D is thereby held between the turntable 106 and the clamper 115 as shown in FIG. 9(A). When the clamp arm 110 is raised, the clamper 115 assumes a somewhat obliquely lifted state as shown in FIG. 11.

Further, as shown in FIGS. 9(A) and 11, a guide wire 116 is stretched between the chassis 103 and the clamp arm 110. The guide wire 116 has, as shown in FIG. 1, the lower end inserted through a small hole 103d defined in the chassis 103 and the upper end fixed by a screw 117 to the upper surface of the clamp arm 110. The guide wire 116 is angularly movable about the insertion point of the guide wire 116 into the small hole 103d. When the clamp arm 110 is lifted as shown in FIG. 9(B), the guide wire 116 is obliquely stretched above the chassis 103 in a tight state. When the clamp arm 110 is lowered, the guide wire 116 is in a laid state to extend along the surface of the chassis 103. As will be seen from FIG. 11, there is a level difference between the turntable 106 on which the disk D is clamped and the position at which the rollers 31 and 41 for ejecting and inserting the disk D relative to the magazine M are provided. With the provision of the guide wire 116, the end of the disk D in the rearmost side of the chassis 103 is moved up by the guide wire 116 when the disk is released from its clamped state upon the lifting of the clamp arm 110, making it easy to return the unclamped disk D into the magazine M.

The structure of a power transmission section provided in the lower unit E will be next described.

As shown in FIGS. 1 and 8, a motor $M_3$ is mounted on the base 100 of the lower unit E. A worm gear 121 is attached to a rotating shaft of the motor $M_3$. A worm wheel 122 held in mesh with the worm 121 is supported on the base 100. Rotative power or torque of a gear 123 integral with the worm wheel 122 is transmitted to gears 124 and 125 and then to a transmission drive gear 128a via gears 126 and 127. The transmission drive gear 128a is fixed to one end of a shaft 129 rotatably provided to extend across the base 100. As shown in the upper side of FIG. 8, another transmission drive gear 128b is fixed to the other end of the shaft 129.

The upper unit C is placed over the lower unit E and they are fixed together in place as shown in FIG. 1. At this time, the aforesaid feed gear 24 provided on the side plate 21a of the cover 21 of the upper unit C is brought into mesh with the transmission drive gear 128a, and another feed gear provided on the opposite side plate 21c of the cover 21 is brought into mesh with the transmission drive gear 128b. In other words, the movable table A to be operated to protrude from and retract into the upper unit 21 is driven by the power of the motor $M_3$ mounted on the lower unit E.

Further, a gear 131 is arranged coaxially with the gear 126 and driven by the gear 127. A small gear 132 is provided integrally with the gear 131 to be held in mesh with a rack 133 provided at the bottom of the base 103. The small gear 132 driven by the power of the motor $M_3$ causes the rack 133 in the directions (k) and (m) shown in FIG. 8. The reduction ratio determined by the above gears is set such that the rack 133 is driven at a speed about ⅓ of the speed at which the feed gear 24 shown in FIG. 4(A) is driven by the transmission drive gear 128a to drive the rack 11k on the movable table A.

As shown in FIG. 8, a drive lever 135 is provided on the inner side of the sub-base 101 to be movable in the directions (k) and (m) together with the rack 133. A drive restrictor pin 136 is projected on the drive lever 135. In FIGS. 9(A) and 9(B), the drive restrictor pin 136 is shown in the form of cross-section.

Guide grooves 103e and 130f are defined in the side wall of the chassis 103 of the playback unit F. Also, a clamp drive lever 141 is provided outside the same side wall. The clamp drive lever 141 has a bent portion 141a inserted through the guide groove 103e, and a pin 142 fixed to the inner side thereof and inserted through the guide groove 103f, allowing the clamp drive lever 141 to slide in the directions (k) and (m) with respect to the chassis 103. A spring 143 is stretched between the bent portion 141a and the inner face of the chassis 103 for urging the clamp drive lever 141 in the direction (k). The clamp drive lever 141 is formed with a hole 141b of which left edge, as viewed on the drawing, serves as an engagement portion 141c. Further, a drive groove 141d is defined in the clamp drive lever 141 at the right end as viewed on the drawing, and a pin 144 provided on the bent portion 108a of the drive link 108 at a lower portion thereof is inserted through the drive groove 141d.

In the condition of FIG. 9(A), the drive restrictor pin 136 extending from the drive lever 135 is positioned in both the hole 141b of the clamp drive lever 141 and an escape hole 103g in continuation with the guide groove 103f in the side wall of the chassis 103. At this time, the chassis 103 of the playback unit F undergoes no restrictions from the base 100 of the lower unit E, so that the chassis 103 is elastically floated with the aid of the dampers 102a to 102d and the coil springs 105a to 105c. Also, at this time, the clamp arm 110 is lowered and the clamper 115 presses the disk D against the turntable 106. The pressing force required for this action is given by a resilient force of the spring 143 urging the clamp drive lever 141 in the direction (k). When the rack 133 is driven by the motor $M_3$ in the direction (m) via the associated gears and the drive restrictor pin 136 extending from the drive lever 135 movable with the rack 133 is also moved in the direction (m), the drive restrictor pin 136 enters the guide groove 103f of chassis 103 and, at the same time, it engages with the engagement portion 141c of the hole 141b defined in the clamp drive lever 141, thereby driving the clamp drive lever 141 in the direction (m), as shown in FIG. 9(B). Thereby, the drive groove 141d at the right end of the clamp drive lever 141 first turns the drive link 108 clockwise to lift the clamp arm 110. Then, upon the drive restrictor pin 136 entering the guide groove 103f of the chassis 103 and also pushing the engagement portion 141c of the drive lever 141 in the direction (m), the playback unit F which has been supported by the dampers 102a to 102d and the coil springs 105a to 105c in an elastically floated manner is now brought into a fixed condition with respect to the base 100 of the lower unit E.

A mechanism related to the above mechanism for bringing the playback unit F into a fixed condition is provided on the bottom of the base 100 of the lower unit E as shown in FIG. 8.

Figure 10:
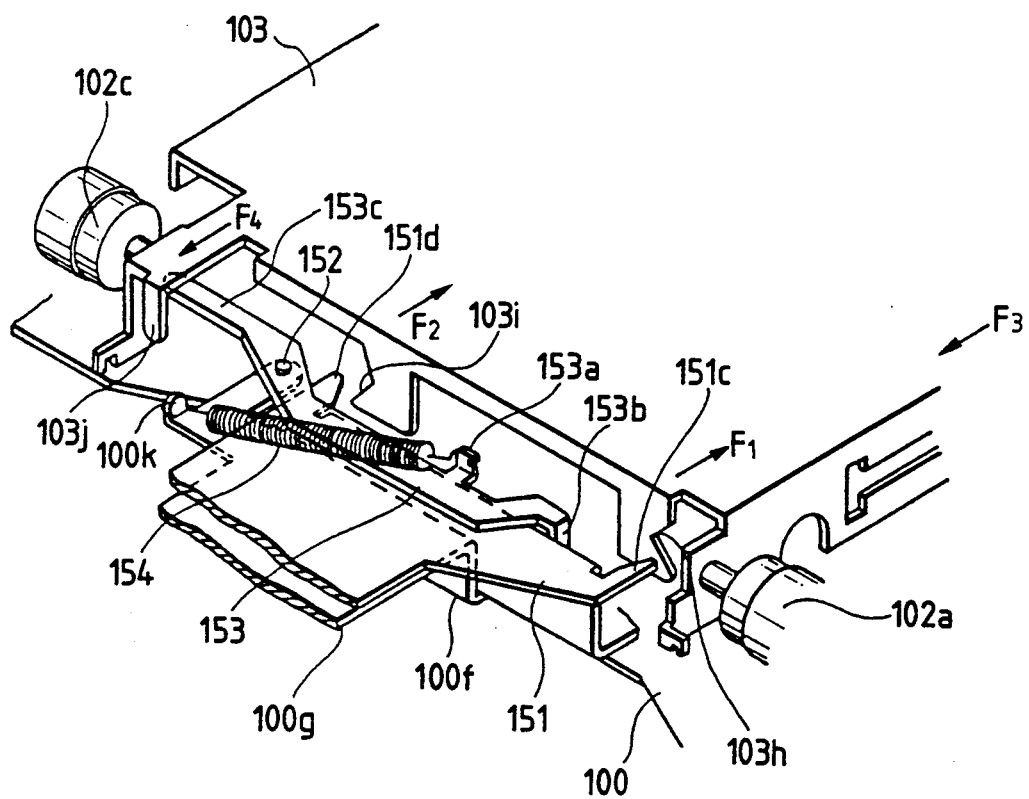
FIG. 10 is a partial perspective view showing a positioning and fixing section of the playback unit.

As shown in FIGS. 8 and 10, the base 100 of the lower unit E is formed at the left edge, as viewed on the drawings, with an upwardly bent portion 100f and a support table 100g horizontally bent to be in continuation with the bent portion 100f. A restrictor member 151 is installed on the bottom surface of the base 100 and the support table 100g. As shown in FIG. 8, a guide piece 100h is formed by bending the edge of the support table 100g and a groove 151a defined in the restrictor member 151 is engaged with the guide piece 100h, whereas a guide piece 100i formed by bending part of the bottom wall of the base 100 is engaged in a groove 151b defined in the restrictor member 151, allowing the restrictor member 151 to slide to the left and right in FIG. 8. A support 100j is provided at the upper edge of the support table 100g, as viewed on FIG. 8, which is formed by bending the base 100, and a support pin 152 is planted on the support 100j to rotatably support a restrictor lever 153. A spring 154 is stretched between a bent piece 153a of the restrictor lever 153 and a bent piece 100k at the side of the support table 100g for urging the restrictor lever 153 clockwise. Further, since an engagement portion 153b formed as part of the restrictor lever 153 is engaged with the restrictor member 151, a resilient force of the spring 154 normally urges the restrictor member 151 to the left as viewed on the drawing. A lever 156 rotatably supported by a pin 155 is provided on the bottom of the base 100, and has its distal end coupled to the right end of the restrictor member 151 via a joint pin 157. A presser pin 158 integral with the rack 133 is abutted against a proximal portion of the lever 156 from the right. When the rack 133 is moved in the direction (k) by the power of the motor $M_3$, as shown in FIGS. 8 and 10, the pressing force exerted on the lever 156 from the presser pin 158 is released and the restrictor lever 153 is turned clockwise by the urging force of the spring 154 so that the restrictor member 151 is also pulled to the left on the drawing. Conversely, when the rack 133 is moved in the direction (m) by the power of the motor $M_3$, the lever 156 is driven clockwise by the presser pin 158 moving in the direction (m) together with the rack 133. Thereby, the restrictor member 151 is pulled via the joint pin 157 to the right on the drawing, and the restrictor member 151 presses the engagement portion 153b of the restrictor lever 153 for turning the restrictor lever 153 counterclockwise.

As detailed in FIG. 10, two restrictor pieces 151c and 151d each having a tapered face are formed as parts of the restrictor member 151, and two V grooves 103h and 103i are provided in the chassis 103 of the playback unit F in opposite relation to the restrictor pieces 151c and 151d, respectively. A restrictor arm 153c is formed as part of the restrictor lever 53, and a bent portion 103j is formed as part of the chassis 103 in opposite relation to the restrictor arm 153c. As mentioned above, when the rack 133 is driven in the direction (m) by the motor $M_3$, the restrictor member 151 is driven to the right on the drawing. At this time, the restrictor pieces 151c and 151d of the restrictor member 151 press the V grooves 103h and 103i of the chassis 103 by forces $F_1$ and $F_2$, respectively. These pressing forces serve to not only fix the chassis 103 which has been elastically floated until then in the unclamped condition of FIG. 9(B), but also press the chassis 103 in the direction of $F_1$ and $F_2$ so that the chassis 103 is moved in the same direction before the fixing. The amount of this movement of the chassis 103 is within a range of allowable movement amounts of the dampers 102a to 102d and the support shafts 104a to 104d. The above action is intended to displace the playback unit F to the right on FIGS. 4(A) and 9(A) as far as possible, thereby increasing the distance between the playback unit F and the magazine M, etc. in opposite relation, when the disk is drawn out of the magazine M in the unclamped condition as shown in FIG. 11. In addition, while the restrictor member 151 is pressing the chassis 103 by the forces $F_1$ and $F_2$, the restrictor arm 153c of the restrictor lever 153 is also pressing the bent portion 103j of the chassis 103 by a force $F_4$. The reason is that since the drive restrictor pin 136 presses the chassis 103 via the drive lever 141 by a force $F_3$ under the unclamped condition as shown in FIG. 9(B), the pressing force $F_4$ of the restrictor arm 153c is applied to keep balance with the forces $F_1$ and $F_2$ and the counter force $F_3$ as illustrated in FIG. 10, to thereby prevent the unwanted moment from acting on the chassis 103.

Furthermore, as shown in FIGS. 8 and 11, a pair of brackets 151e are formed by bending both side edges of the restrictor member 151 in its end portion adapted for guiding disks, and guide plates 161 are rotatably supported by pins 162 on the respective brackets 151e. Both the guide plates 161 are interconnected by a shaft 164. A spring 165 wound around the shaft 164 urges the guide plates 161 counterclockwise in FIG. 11. A bent guide surface 161a is formed on the right side of each of the guide plate 161 as viewed on the drawing, and each guide plate 161 is provided with a roller 163 extending inwardly. The guide surface 161a and the roller 163 serve to prevent a gap, into which the disk may enter, from being formed below the bottom of the magazine M when drawing out the disk out of the magazine M, as shown in FIG. 11. The roller 163 can roll while contacting the underside of the magazine M to follow any steps formed on the bottom of the magazine M, when the magazine M is moved together with the movable table A to the right in FIG. 11. Incidentally, the aforesaid lower follower roller 31 is located on the restrictor member 151 as shown in FIG. 11.

As explained above, the power of the motor $M_3$ mounted on the lower unit E first drives the transmission drive gears 128a and 128b, whereupon the feed gear 24 and the like gear on the upper unit C are driven to move the movable table A via the rack 11k and the like rack. The power of the motor $M_3$ also drives the rack 133 to lift and lower the clamp arm 110 for clamping and unclamping the disk. When unclamped, the chassis 103 of the playback unit F is fixed in place with the aid of the drive restrictor pin 136, the restrictor member 151 and the restrictor lever 153. Further, as mentioned above, the rack 133 is driven at the reduced speed ratio of ⅓ with respect to the movement of the movable table A through the group of gears provided on the lower unit E. The relation in movement between the rack 133 and the movable table A is as follows. When the movable table A is retracted into the upper unit C, the clamp arm 110 is first lowered and, thereafter, the movable table A and the magazine M are moved to a position over the clamp arm 110 which has been lowered as shown in FIG. 4(B). When the movable table A is protruded as shown in FIG. 4(A), the clamp arm 110 is lifted immediately after the movable table A and the magazine M have passed over the clamp arm 110.

Operation of the CD drive unit of the above-mentioned structure will be next described.

MAGAZINE LOADING AND EJECTING OPERATION

The magazine is loaded and ejected under a condition that the movable table A is retracted into the cover 21 of the upper unit C and accommodated over the lowered clamp arm 110, as shown in FIG. 4(B).

The operation of retracting the movable table A into the upper unit C is performed by the motor $M_3$ mounted on the lower unit E. When the transmission drive gears 128a and 128b are driven by the motor $M_3$ counterclockwise via the associated gears, the feed gear 24 provided on the side plate 21a of the cover 21 of the upper unit C is, on one side, driven clockwise to drive the rack 11k (see FIGS. 4(A) and 4(B)) on the side plate 11b of the movable table A, thereby retracting the movable table A into the upper unit C. At this time, since the rack 133 shown in FIG. 8 is driven by the motor $M_3$ in the direction (k), the drive restrictor pin 136 provided on the drive lever 135 moving together with the rack 133 is positioned in both the hole 141b of the clamp drive lever 141 provided on the side wall of the chassis 103 of the playback unit F and the escape hole 103g of the chassis 103. Thereby, the drive link 108 is turned counterclockwise so that the clamp arm 110 is lowered toward the turntable 106. Also, with the rack 133 moving in the direction (k), the presser pin 158 shown in FIG. 8 does not press the lever 156, causing the urging force of the spring 154 to move the restrictor member 151 lefwardly and turn the restrictor lever 153 clockwise. Accordingly, the pressing forces indicated by $F_1$, $F_2$, $F_3$, $F_4$ in FIG. 10 to restrict the movement of the playback unit F will not develop so that the chassis 103 of the playback unit F is brought into a state elastically floated by the dampers 102a to 102d and the coil springs 105a to 105c. The movable table A is accommodated over the playback unit F thus elastically floated with the clamp arm 110 lowered.

At this time, as shown in FIG. 4(B), the bent portion 26a of the lock plate 26 provided on the side plate 21a of the cover 21 rides over the upper edge of the side plate 11b of the movable table A, and the lock plate 26 is turned clockwise. Therefore, the roller holder 32 is driven by the joint link 36 clockwise and the lower follower roller 31 is retreated to a position below the magazine M.

The magazine M is inserted under such a condition. The magazine M is inserted between the bottom plate 11a and the guide plates 11c shown in FIG. 1, while pushing the door 19 of the movable table A inwardly. Upon insertion of the magazine M, the lock pins 12 are locked into the lock grooves 1f and 1h while being guided by the guide slopes 1e and 1g provided on the bottom surface of the case 1 of the magazine M (see FIG. 3), thereby locking the magazine M in the movable table A. Since then, the movable table A and the magazine M are operated as one piece until the magazine ejecting operation.

In the foregoing mechanism of locking the magazine, as shown in FIGS. 1 and 3, the lock pins 12 are projected from the bottom plate 11a of the movable table A such that they are movable in the directions of (e) and counter to (e), but immovable to the left and right in FIG. 3, i.e., in the direction of insertion of the magazine M. Further, when the magazine M is inserted, the guide slopes 1e and 1g cause the lock pins 12 to move in the direction reverse to (e). Accordingly, even if the magazine M is inserted in the other way, i.e., with the rear end wall 1d of the magazine M directed inwardly, by mistake, the rear end wall 1d of the magazine M strikes against the lock pins 12 so that the magazine M cannot further inserted, because of the absence of guide slopes on the side of the rear end wall 1d. False insertion of the magazine M can be thus prevented.

The operation of ejecting the magazine M is performed only when the movable table A and the magazine M are retracted over the playback unit F as shown in FIG. 4(B).

With an eject command issued, the motor $M_1$ of the select mechanism B shown in FIG. 5 drives the worm wheel 51 and hence the drive screw 49 integral therewith, whereupon the elevator block 45 is lowered and the motor $M_1$ is then stopped upon the sensor arm 45a turning on the sensor switch $SW_1$. When the elevator block 45 reaches such a position, the ejection/insertion roller 41 lifting and lowering together with the elevator block 45 assumes the original position indicated by (O) as shown in FIG. 11. At the original position, the drive arm 86b of the shifter 86 lifting and lowering together with the elevator block 45 is positioned facing the projection 13a of the lock lever 13 (see FIG. 3), provided on the underside of the bottom plate 11a of the movable table A, from the inner side.

Under such a condition, the motor $M_2$ disposed in the select mechanism B is energized to drive the transmission gear 72 via the worm wheel 62 and the gears 63, 64, 71, thereby driving the shift gear 74 via the gear 73 integral with the transmission gear 72. The shift gear 74 is thereby rotated 360 degrees in either direction as desired. While the cam 75 integral with the shift gear 74 is turning round through 360 degrees, the drive lever 81 shown in FIGS. 6(A) and 6(B) is kept driven in the direction (i). After 360-degree rotation of the shift gear 74, the drive lever 81 is restored in the direction (h) as shown in FIG. 6(A). With one cycle of this reciprocal movement of the drive lever 81, the shifter 86 sandwiched between the holder 81d at the left end of the drive lever 81 and the bent piece 84a is driven clockwise as viewed from above on FIG. 5. Accordingly, the projection 13a of the lock lever 13 shown in FIG. 3 is driven by the drive arm 86b of the shifter 86 in the direction opposite to (e), thereby disengaging the lock pins 12 from the lock grooves 1f and 1h of the magazine M. As a result, the eject pin 15 pushes the presser step 1i of the magazine M by the resilient force of the spring 18 to eject the magazine M from the movable table A.

DISK REPLACING OPERATION

While the magazine M is loaded and ejected, as stated above, in the condition that the magazine M is retracted as shown in FIG. 4(B), the operation of playing back the music from the disk D is also performed in the condition of FIG. 4(B). Under that condition, the disk D is sandwiched between the turntable 106 and the clamper 115, and the magazine M is accommodated over them. The operation of replacing the disk from the playback state of FIG. 4(B) will be explained below.

In the disk replacing operation, the motor $M_3$ of the lower unit E is driven under the condition of FIG. 4(B). The produced driving force or torque is transmitted to the transmission drive gears 128a and 128b via the group of gears shown in FIG. 8, the feed gear 24 provided on the side plate 21a of the upper unit C and another feed gear provided on the opposite side plate 21c are both driven counterclockwise to apply the power to the rack 11k provided on the side plate 11b of the movable table A and another rack provided on the side plate 11c, respectively, thereby making the movable table A protrude from the upper unit C. FIG. 7 shows such a protruded condition of the movable table A during the disk replacing operation. At this time, since the movable table A is protruded in such a state that the magazine M is held in the movable table A and the door 19 remains turned upwardly, the user can easily recognize that the protruded magazine M is not the ejected one and under the disk replacing operation. Upon the protrusion of the movable table A, as shown in FIG. 4(A), the bent portion 26a of the lock plate 26 is dislodged from the upper edge of the side plate 11b of the movable table A and turned counterclockwise by the urging force of the spring 28. Accordingly, the roller holder 32 is driven counterclockwise via the joint link 36 so that the lower follower roller 31 is brought into pressure contact with the ejection/insertion roller 41 from below. The pressing force at this time is given by the resilient force of the spring 28.

At the same time when the transmission drive gears 128a and 128b are driven by the motor $M_3$ of the lower unit E to protrude the movable table A, the driving force of the motor $M_3$ is also transmitted to the rack 133 via the group of gears shown in FIG. 8 for driving the rack 133 in the direction (m) shown in FIG. 8. Thereby, the drive restrictor pin 136 provided on the drive lever 135 moving together with the rack 133 in the same direction drives the clamp drive lever 141 provided on the chassis 103 of the playback unit F in the direction (m). Accordingly, as shown in FIG. 9(B), the drive link 108 is driven clockwise via the pin 144 following the drive groove 141d of the clamp drive lever 141, so that the clamp arm 110 is lifted in a substantially horizontal attitude. Thus, the disk D is released from its clamped state onto the turntable 106. Upon release from the clamped state, the end of the guide wire 116 is raised to make it tightly stretched in an oblique state as shown in FIG. 9(B), causing the guide wire 116 to elevate the disk D at the right end on the drawing. The operation of lifting the clamp arm 110 and the operation of protruding the movable table A are carried out at such timing that the clamp arm 110 is completely lifted just when the magazine M, etc. have been moved away from above the disk D. In addition, at the time when the innermost end of the disk D is elevated by the guide wire 116 upon the lifting of the clamp arm 110, the lower follower roller 31 is lifted through the clockwise rotation of the roller holder 32, resulting in a condition that the left end of the disk D, on the drawing, is sandwiched between the ejection/insertion roller 41 and the lower follower roller 31.

Further, as the result that the rack 133 is moved in the direction (m) in FIG. 8 and the drive restrictor pin 136 of the drive lever 135 is also moved in the direction (m), the drive restrictor pin 136 presses the chassis 103 in the direction of $F_3$ via the clamp drive lever 141. Simultaneously, the presser pin 158 moving together with the rack 133 drives the lever 156 clockwise, whereby the restrictor member 151 is pulled to the right and the restrictor lever 153 is driven counterclockwise. Accordingly, as shown in FIG. 10, the restrictor pieces 151c and 151d of the restrictor member 151 engage in the V grooves 103h and 103i of the chassis 103, respectively, to press it in the direction of $F_1$ and $F_2$, while the chassis 103 is also pressed by the restrictor arm 153c of the restrictor lever 153 in the direction of $F_3$. The chassis 103 is thereby brought into a fixed state rather than an elastically floated state. Also, as mentioned above, since the chassis 103 is brought into the fixed state after being moved by the forces $F_1$ and $F_2$ to the right on the drawing, the playback unit F is slightly displaced away from the opening 3 of the magazine M.

The replacement of the disk is carried out under a condition that the movable table A is protruded into the state of FIG. 7, the clamp arm 110 is lifted, and the chassis 103 of the playback unit F is fixed in place, as explained above. First, the drive screw 49 is driven by the motor $M_1$ of the select mechanism B shown in FIG. 5 to lift and lower the elevator block 45 so that the ejection/insertion roller 41 is lifted and lowered via the roller joint lever 47 correspondingly to move into any of the select positions indicated by (1) to (3) in FIG. 11. This vertical movement is controlled by the optical sensor 56 which detects the number of revolutions of the sensor rotator 55 shown in FIG. 5, as mentioned above. For example, when the disk D having been clamped on the turntable 106 until then is to return into the 2nd disk storage space $S_2$ of the magazine M, the ejection/insertion roller 41 assumes the 2nd stage select position indicated by (2) so that the disk D sandwiched at its end between the roller 41 and the lower follower roller 31 is positioned facing the space $S_2$ from front. Upon the lifting and lowering of the elevator block 45, the shifter 86 shown in FIG. 5 is simultaneously lifted and lowered, causing the drive arm 86b to face any of the presser members 4d, 5d, 6d, respectively provided on the movable plates 4, 5, 6 in the magazine M shown in FIG. 2, from the inner side. Thus, when the disk is to return into the 2nd space $S_2$, the drive arm 86b faces the presser member 5d of the 2nd stage movable plate 5 from the inner side.

After control of the select position of the ejection/insertion roller 41 is completed, the motor $M_2$ of the select mechanism B shown in FIG. 5 is driven to rotate the ejection/insertion roller 41 clockwise via the group of gears and, at the same time, to drive the shift gear 74 shown in FIG. 6(A) counterclockwise. The amount of rotation of the motor $M_1$ at this time is set to rotate the shift gear 74 through 360 degrees such that the drive lever 81 is moved by the cam 75 in the direction (i) and then returned in the direction (h), i.e., corresponding to one cycle period of reciprocal movement of the drive lever 81. During this reciprocal movement, the arm 86a of the shifter 86 located between the holder 81d provided at the left end of the drive lever 81 and the bent piece 84a is first pulled to drive the shifter 86 clockwise in FIG. 3. In other words, the drive lever 81 is first driven in the direction (i) by the cam 75 shown in FIGS. 6(A) and 6(B), and then remains in such a state for a while. A little before the shift gear 74 completes the rotation of 360 degrees rotation, the drive lever 81 is returned in the direction (h). Accordingly, the shifter 86 is first turned clockwise and then kept in such a rotated state, followed by restoring counterclockwise. While the shifter 86 remains rotated clockwise, the drive arm 86b is pushing the presser member 5d provided on the 2nd stage movable plate 5 of the magazine M shown in FIG. 2 in the direction β so that the movable plate 5 is turned in the direction β. Thereby, the disk D sandwiched between the ejection/insertion roller 41 rotating clockwise and the lower follower roller 31 held in pressure contact with the roller 41, as mentioned above, is returned into the 2nd stage disk sterage space $S_2$ without interfering with the presser member 5d of the magazine M. When the shift gear 74 completes the rotation of 360 degrees and the shifter 86 is restored counterclockwise as shown in FIG. 3, the drive arm 86b is detached from the presser member 5d of the magazine M, allowing the movable plate 5 in the magazine M to restore by the resilient force of the spring 5b in the direction α in FIG. 2. Consequently, the disk D is now pressed by the presser member 5*d* at its portion indicated by (d) and held in the magazine M in such a manner as not to slip off therefrom.

The operation of selecting the disk, drawing it out of the magazine and clamping it on the playback unit F is a reversal of the above operation of returning the disk.

For example, when drawing out the disk in the uppermost disk storage space S$_3$ of the magazine M, the motor M$_1$ of the select mechanism B shown in FIG. 5 is energized to lift the elevator block 45 for moving the ejection/insertion roller 41 to the 3rd select position (3) of FIG. 11. At the same time, the drive arm 86*b* of the shifter 86 lifting together with the elevator block 45 is positioned facing the presser member 6*d*, provided on the uppermost movable plate 6 in the magazine M shown in FIG. 2, from the inner side.

Under such a condition, the motor M$_2$ is energized drive the ejection/insertion roller 41 counterclockwise and the shift gear 74 clockwise. The amount of rotation of the motor M$_2$ also corresponds to the period of time in which the shift gear 74 rotates 360 degrees, but clockwise here. The drive lever 81 is first pulled in the direction (i) by the cam 75 rotating together with the shift gear 74 clockwise, and then returned in the direction (h) immediately before completing the rotation of 360 degrees. In response to such a movement of the drive lever 81, the shifter 86 shown in FIG. 3 is first driven to turn clockwise and then remains turned for a while. When the shifter 86 is driven to turn clockwise, the drive arm 86*b* presses the presser member 6*d* of the movable plate 6 in the magazine M shown in FIG. 2 in the direction β, so that the movable plate 6 is driven in the direction β. Accordingly, the disk D accommodated in the uppermost disk storage space S$_3$ is pushed at its portion shown at (c) by the ejector pin 6*c* provided on the movable plate 6, for making the fore end of the disk D protrude through the opening 3. At this time, since the ejection/insertion roller 41 positioned in front of the opening 3 is driven counterclockwise, the fore end of the disk D is held between the roller 41 and the lower follower roller 31, allowing the disk D to be drawn out of the space S$_3$ in the magazine M. The disk D is then delivered to the right in FIG. 11.

The period of time in which the motor M$_2$ is to be rotated is set to such an extent that the shift gear 74 and the cam 75 turns round through 360 degrees to reciprocate the drive lever 81 once. This rotation period is controlled, for example, by providing a sensor switch at a location opposite to the left end of the drive lever 81 and using the time elapsed from the point at which the drive lever 81 detaches from the sensor switch to the point at which it contacts the sensor switch again as a base value. The amount of rotation of the ejection/insertion roller 41 is set such that while the shift gear 74 is rotating 360 degrees, the center of the disk D is moved through the distance enough to reach a position above the turntable 106. In practice, the above control is performed such that the 360-degree rotation of the shift gear 74 will not be completed at the time when the disk is completely drawn out by the ejection/insertion roller 41. The resulting time lag can be absorbed by slippage of the clutch between the gears 64 and 66 shown in FIG. 3.

When the operation of drawing out the disk is completed, the motor M$_1$ is driven again to lower the elevator block 45 until the position where the switch SW$_1$ is turned on, i.e., the original position (0) shown in FIG. 11. The end of the disk D still sandwiched between the rollers 41 and 31 is thereby lowered so that the disk end is led to a position facing the roller 163 or the guide surface 161*a* shown in FIG. 11. Since then, therefore, any movement of the disk to the left on the drawing can be prevented by the presence of the roller 163 or the guide surface 161*a*.

During the above disk replacing operation, the ejection/insertion roller 41 will be never lowered down to the original position (0), but is positioned somewhere between the 1st select position (1) and the 3rd select position (3). Under such a state, as shown in FIG. 4(A), the bent portion 26*a* at the upper end of the lock plate 26 coupled to the roller holder 32 via the joint link 36 will be never moved away from the vertical face, indicated by (g), at the inner end of the movable table A. Accordingly, the movable table A is prevented by the bent portion 26*a* from further moving inwardly during the disk replacing operation. Thus, even if the movable table A is pushed by mistake under the condition of FIG. 7, the movable table A will not enter the upper unit C. Meanwhile, when the ejection/insertion roller 41 is lowered down to the original position (0) after the completion of drawing out the disk as mentioned above, the roller holder 32 is turned clockwise with the lower follower roller 31 pushed down, thereby turning the lock plate 26 clockwise. The bent portion 26*a* now assumes a position facing an inclined edge 11*l* above the vertical face, indicated by (g), at the inner end of the side plate 11*b* of the movable table A, whereupon the movable table A is released from a restricted state. When the movable table A is moved to the right following that, the bent portion 26*a* of the lock plate 26 is guided along the inclined edge 11*l* at the inner end of the side plate 11*b* and then allowed to slide over the upper edge of the side plate 11*b*, resulting in that the roller holder 32 is rotated clockwise and the lower follower roller 31 is detached from the disk to retreat downwardly, as shown in FIG. 4(B). In addition, if the ejection/insertion roller 41 is at the original position (0) when the movable table A is retracted into the upper unit C, the roller 41 would strike against the clamp arm 110 and so on. Therefore, before the roller 41 reaches a position above the clamp arm 110, the motor M$_1$ is energized again to lift the elevator block 45 for moving the ejection/insertion roller 41 up to the 1st select position (1) or any other higher position.

After the operation of drawing out the disk is completely finished as stated above, the motor M$_3$ in the lower unit E is energized to drive the transmission drive gears 128*a* and 128*b* counterclockwise via the group of gears, whereby the feed gear 24 is driven clockwise to retract the movable table A into the upper unit C. At this time, the rack 133 is also driven by the motor M$_3$ in the direction (m) in FIG. 8 to move the drive restrictor pin 136 in the direction (m) together with the drive lever 135. The clamp arm 110 is thereby lowered via the drive groove 141*d* of the drive lever 141. Then, the disk D is sandwiched between the clamper 115 and the turntable 106 so that the clamper 115 presses the disk D against the turntable 106 by the resilient force of the spring 143 for urging the drive lever 103. Also, with the movement of the rack 133 in the direction (m), the restrictor member 151 is restored to the left in FIG. 8, the restrictor lever 153 is turned clockwise, and further the drive restrictor pin 136 is positioned in both the hole 141*b* and the escape hole 103*g* as shown in FIG. 9(A). Accordingly, the restraint forces F$_1$, F$_2$, F$_3$, F$_4$ exerting on the chassis 103 as shown in FIG. 10 are released, bringing the playback unit F into an elastically floated condition by the dampers 102a to 102d and the coil springs 105a to 105c.

Immediately after the clamp arm 110 is lowered during the above clamping operation, the movable table A and the magazine M are retracted over the clamp arm 110 as shown in FIG. 4(B). Under this condition, the disk D is driven to rotate for playing back the music by the light pickup.

In the illustrated embodiment, as will be seen from FIG. 11, the ejection/insertion roller 41 is lifted and lowered along an arcuate path while turning about the shaft 43 which supports the swing lever 42, whereas the lower follower roller 31 is lifted and lowered along an arcuate path while turning about the pin 33 which supports the roller holder 32. Accordingly, the direction of a tangent line to the contact point between the rollers 41 and 31, i.e., the direction in which a feed acts, varies depending on the vertical position of the rollers. In FIG. 11, the feed direction tangential to the contact point between the rollers 41 and 31 as developed when the ejection/insertion roller 41 is at the 1st stage select position (1) is indicated by (o). The feed direction for the 2nd stage select position (2) is indicated by (p) and the feed direction for the 3rd stage select position (3) is indicated by (q). The feed force produced to return the disk D into the magazine M is directed slightly downwards for (o), (p) and substantially horizontal for (q). In the embodiment of FIG. 11, when the clamp arm 110 is lifted, the right end of the disk D, on the drawing, is raised to a fairly elevated level by the guide wire 116. Therefore, the feed direction (q) given by the rollers 41 and 31 for the 3rd position (3) is set to be substantially horizontal so that the disk D may be returned into the space $S_3$ while being kept elevated. The feed directions for the 2nd select position (2) and the 1st select position (1) are set to be slightly downward so that when the disk D being elevated by the guide wire 116 is delivered toward the space $S_2$ or $S_1$ in the magazine M, the disk D can be returned into the corresponding space in the magazine with certainty.

The direction of the feed force is determined depending on which level is selected as a base position of the disk D. In FIG. 11, the direction of the feed force is determined taking the 3rd select position (3) as a base. FIG. 12 shows another embodiment in this respect. In the 2nd stage select position (2) shown at (B) of FIG. 12, the disk feed direction (p) given by the rollers 41 and 31 toward the magazine is substantially horizontal. In the 1st stage select position (1) shown at (A) of FIG. 12, the disk feed direction (o) given by the rollers 41 and 31 toward the magazine is slightly downward. Further, in the 3rd stage select position (3) shown at (C) of FIG. 12, the disk feed direction (q) toward the magazine is slightly upward.

The above explanation is made with reference to the operation of replacing the disk. In the case where no disk is clamped under the condition of FIG. 4(B) and, after loading the new magazine M, some disk is drawn out to be clamped over the turntable, the movable table A is also protruded from the upper unit C together with the magazine M in a like manner. Such an operation is the same as the above disk replacing operation except that the former includes no step of returning the disk into the magazine M. Thus, the disk is drawn out of the magazine and clamped on the turntable in the same manner.

Although the illustrated embodiment accommodates three disks in the magazine M, the number of disks may be four or more, or two.

Although the foregoing embodiment is explained as playing back the music from compact disk using a disk player equipped on automobiles, the present invention is not limited to the illustrated embodiment and also applicable to home players for compact disks or the like as well. Further, although the disk playback unit F in the above embodiment is explained as having only a playback function, it may be a unit for an optical memory device such as a photomagnetic disk which is capable of both recording and reproduction.

Although the movable plates 4, 5, 6 in the magazine M are operated to turn in the above embodiment, they may be moved linearly toward the opening 3.

Moreover, in the above embodiment, only one of the paired rollers for drawing out the disk, i.e., the ejection/insertion roller 41, is driven by the motor $M_2$. As an alternative, however, only the lower follower roller 31 may be driven by a motor, or both the rollers 31 and 41 may be driven.

In the structure of the magazine shown in FIGS. 2(A) and 2(B), all the disks can be ejected at a time by fast grasping the uppermost take-out knob 6e and the lowermost take-out knob 4e by fingers from above and below and operating them together with the intermediate take-out knob 5e to turn all the movable plates 4, 5, 6.

The above embodiment illustrates the disk player of the type that the magazine is accommodated over the playback unit. However, the present invention is not limited to this type disk player and also applicable to a conventional disk changer in which the magazine position is set immobile and a disk drawn out of a magazine is loaded into a playback unit positioned next to the magazine.

According to the present invention, as described above, since a driven part for operating a mechanism to eject a disk is provided on the front lateral side of a magazine in the direction of insertion thereof, a disk player has a structure of having a drive mechanism provided on the lateral side of a player body in front of the magazine to operate the driven part on the magazine. With the drive mechanism disposed in front of the magazine, the need of disposing the drive mechanism in such a manner as to extend up to rearwardly of the magazine for taking out the disk can be eliminated and, therefore, the disk player can be reduced in size.

Further, according to the present invention, when ejecting the disk from the magazine, the disk is pushed out through an opening of the magazine with operation of a movable plate. Accordingly, the need of providing a separate ejector member, which has been essential in the prior art, can be avoided, making it possible to simplify the structure of the magazine and reduce the magazine size. Also, since the disk can be moved to a large extent with the operation of the movable plate, the length of the disk protruding from the opening can be so increased as to ensure the subsequent positive delivery of the disk. When a certain disk in the magazine is ejected, the corresponding movable plate serves as also a guide plate for the disk. Accordingly, the disk can be more easily guided than the conventional structure that partition plates are fixedly arranged with spacings therebetween.

In addition, according to the present invention, any disk in the magazine can be easily taken out to facilitate the operation of replacing disks in the magazine.

What is claimed is:

1. A disk player with a disk select function comprising:
- a playback unit including a rotation mechanism for rotating a disk, a clamper for placing said disk on said rotation mechanism, and a pickup positioned to face said disk;
- a magazine having an opening positioned towards said playback unit and accommodating a plurality of disks therein;
- an ejection mechanism provided in said magazine for protruding a desired disk through said opening when said magazine has been loaded into said disk player, said ejection mechanism including a driven part positioned close to said opening of said magazine;
- a drive mechanism provided on said disk player and engaging said driven part for driving said ejection mechanism to protrude said desired disk through the said opening of said magazine; and
- a disk feeding mechanism positioned in front of said opening of said magazine and receiving the protruded desired disk for feeding the desired disk toward said playback unit.

2. A disk player according to claim 1, wherein said driven part is located in a recess formed in a lateral side of said magazine adjacent to said opening, and an inclined surface is formed at the opening end of said magazine in front of said driven part.

3. A disk player according to claim 1, wherein said driven part functions as a presser for holding the disks accommodated in said magazine, while driving said ejection mechanism in a direction to eject the disk and operating in a direction to release a force holding the disk, and wherein said disk player is provided with a restrictor positioned to face said driven part of the loaded magazine from the front side in the direction of operation of said driven part and moved away from said driven part when said drive mechanism is engaged with said driven part.

4. A disk player with a disk select function comprising:
- a playback unit including a rotation mechanism for rotating a disk, a clamper for placing said disk on said rotation mechanism, and a pickup positioned to face said disk;
- a magazine having an opening positioned towards said playback unit and accommodating a plurality of disks therein;
- a plurality of movable plates supported in said magazine to define a plurality of disk storage spaces partitioned by said movable plates, each of said movable plates being provided with an ejector positioned to face the disk accommodated in the corresponding disk storage space from the opposite side to said opening of said magazine;
- a drive mechanism for driving a desired one of said movable plates in a direction for said ejector to push out the desired disk through said opening when said magazine has been loaded into said disk player; and
- a disk feeding mechanism positioned in front of said opening of said magazine and receiving the desired disk pushed out by said drive mechanism for feeding the desired disk toward said playback unit.

5. A disk player according to claim 4, wherein said movable plates are each supported to be rotatable about the center of rotation located in an inner portion of said magazine on the same side as one end of said opening, a presser facing the disk from the side of said opening is provided on each said movable plate at a position nearer to said opening than said center of rotation of said movable plate, and each said movable plate is urged in the direction for said presser to press the disk into said magazine.

6. A disk player according to claim 4, wherein a portion for preventing the disk from entering said magazine along an inner wall thereof is formed at the edge of one of said movable plates adjacent to the inner wall of said magazine, said edge being directed toward said opening.

7. A disk player according to claim 4, wherein said disk feeding mechanism has a function of returning the disk into said magazine.

8. A disk player according to claim 7, wherein an inclined face adapted to increase said disk storage space in the direction toward said opening is formed at the edge of each said movable plate in the direction toward said opening.

9. A disk player with a disk select function comprising:
- a playback unit including a rotation mechanism for rotating a disk, a clamper for placing said disk on said rotation mechanism, and a pickup positioned to face said disk,
- a magazine having an opening positioned towards said playback unit and accommodating a plurality of disks therein;
- a plurality of ejection mechanisms in said magazine for protruding the disks through the opening of said magazine in one-to-one corresponding relation to the disks;
- a plurality of take-out knobs for operating said ejection mechanisms positioned in a recess formed in a lateral side of said magazine, such that an uppermost and lowermost ones of said take-out knobs are exposed to be operable from above and below said magazine respectively, and the intermediate take-out knob is exposed to be operable from the side of said magazine; and
- a disk feeding mechanism positioned in front of said opening of said magazine for feeding a desired disk protruded through the opening toward said playback unit.

10. A disk player according to claim 9, wherein a plurality of movable plates are movably supported in said magazine to define a plurality of disk storage spaces partitioned by said movable plates, and each of said movable plates is provided with said take-out knob.

11. A disk player according to claim 9, wherein a presser facing each disk accommodated in said magazine from the side of said opening is provided in said magazine, and said presser is provided with said take-out knob.

12. A disk player with a disk select function comprising:
- a playback unit for playing back a disk;
- a magazine having an opening positioned toward said playback unit and accommodating a plurality of disks therein; and
- a disk feeding mechanism positioned in front of said opening of said magazine to feed a desired disk in said magazine toward said playback unit, wherein an ejection mechanism for protruding the desired disk through said opening, when said magazine has been loaded into said disk player, is provided in said magazine, a driven part for operating said ejection mechanism to protrude the desired disk through said opening is provided in a recess formed in a lateral side of said magazine close to said opening, an inclined surface is formed at the opening end of said magazine in front of said driven part, and a drive mechanism engaging said driven part to drive said ejection mechanism is provided on said disk player.

13. A disk player with a disk select function, comprising:

a playback unit for playing back a disk, a magazine having an opening positioned toward said playback unit and accommodating a plurality of disks therein; and a disk feeding mechanism positioned in front of said opening of said magazine to feed a desired disk in said magazine toward said playback unit, wherein an ejection mechanism for protruding the desired disk through said opening, when said magazine has been loaded into said disk player, is provided in said magazine, a driven part for operating said ejection mechanism to protrude the desired disk through said opening is provided in a lateral side of said magazine close to said opening, said driven part functioning as a presser for holding the disks accommodated in said magazine, while driving said ejection mechanism in a direction to eject the disk and operating in a direction to release a force holding the disk, a drive mechanism engaging said driven part to drive said ejection mechanism is provided on said disk player and a restrictor is provided in said disk player and positioned to face said driven part of the loaded magazine from the front side in the direction of operation of said driven part and moved away from said driven part when said drive mechanism is engaged with said driven part.

14. A disk player with a disk select function comprising a playback unit for playing back a disk;

a magazine having an opening positioned toward said playback unit and accommodating a plurality of disks therein; and a disk feeding mechanism positioned in front of said opening of said magazine to feed a desired disk in said magazine toward said playback unit, wherein a plurality of plates are each supported to be rotatable about a center of rotation located in an inner portion of said magazine on the same side as one end of said opening to define a plurality of disk storage spaces partitioned by said plates, each of said plates is provided with an ejector positioned to face the disk accommodated in the corresponding disk storage space from the opposite side to said opening of said magazine, and a presser facing the disk from the side of said opening and positioned nearer to said opening than said center of rotation of said plate, each said plate being urged in the direction for said presser to press the disk into said magazine, and a drive mechanism for driving a desired one of said plates in the direction for said ejection to push out the desired disk through said opening is provided on said disk player.

15. A disk player with a disk select function comprising:

a playback unit for playing back a disk;

a magazine having an opening positioned toward said playback unit and accommodating a plurality of disks therein; and a disk feeding mechanism positioned in front of said opening of said magazine to feed a desired disk in said magazine toward said playback unit, wherein a plurality of plates are movably supported in said magazine to define a plurality of disk storage spaces partitioned by said plates, each said plate is provided with an ejector positioned to face the disk accommodated in the corresponding disk storage space from the opposite side to said opening of said magazine, a raised portion for preventing the disk from entering said magazine along an inner wall thereof is formed at the edge of one of said plates adjacent to the inner wall of said magazine, said edge being directed toward said opening, and a drive mechanism for driving a desired one of said plates in the direction for said ejector to push out the disk through said opening is provided on said disk player.

* * * * *